US005408672A

United States Patent [19]

Miyazawa et al.

[11] Patent Number: 5,408,672
[45] Date of Patent: Apr. 18, 1995

[54] MICROCOMPUTER HAVING ROM TO STORE A PROGRAM AND RAM TO STORE CHANGES TO THE PROGRAM

[75] Inventors: Hideo Miyazawa; Shigeyuki Komatsu, both of Kawasaki; Michio Yoshida, Tokyo; Toshiaki Suzuki, Katano; Akito Miyamoto, Takatsuki; Azuma Miyazawa, Mitaka; Toshiaki Ishimaru, Hino, all of Japan

[73] Assignees: Matsushita Electric Industrial Co., Osaka; Olympus Optical Co., Ltd., Tokyo, both of Japan

[21] Appl. No.: 976,400

[22] Filed: Nov. 13, 1992

[30] Foreign Application Priority Data

Nov. 18, 1991 [JP] Japan .................................. 3-301645
Sep. 24, 1992 [JP] Japan .................................. 4-254300

[51] Int. Cl.$^6$ ............................ G06F 9/06; G06F 9/26; G06F 12/12; G06F 13/40
[52] U.S. Cl. ................................. 395/800; 364/229.5; 364/230.6; 364/234.1; 364/239; 364/239.4; 364/240.5; 364/242.33; 364/242.91; 364/242.8; 364/243.6; 364/DIG. 1; 364/DIG. 2
[58] Field of Search .............. 395/800, 425, 400, 275, 395/250, 375, 575, 500, 650, 325, 200; 364/DIG. 1, DIG. 2; 371/10.1, 10.2

[56] References Cited

U.S. PATENT DOCUMENTS

| 4,542,453 | 7/1985 | Patrick et al. ................... 395/275 |
| 4,682,167 | 7/1987 | Ikeda et al. ................... 340/825.23 |
| 5,309,444 | 5/1994 | Dartois et al. ................... 371/10.2 |

FOREIGN PATENT DOCUMENTS

| 333926 | 2/1991 | Japan . |
| 375930 | 3/1991 | Japan . |
| 3-186927 | 8/1991 | Japan . |

Primary Examiner—Alyssa H. Bowler
Assistant Examiner—Daniel H. Pan
Attorney, Agent, or Firm—Stevens, Davis, Miller & Mosher

[57] ABSTRACT

When an error is found in a program of the microcomputer, there are stored in a writable memory change address data of an address of a wrong instruction to be subjected to modification or insertion in the read-only memory, change instruction codes of modification or insertion for replacement of the wrong instruction, and a control code controlling a second program counter. When the contents of the program counter match the change address data stored in the writable memory, the program data in the writable memory is executed in place of the wrong instruction in the read-only memory according to the control code controlling the second program counter. Consequently, even when a bug is found in the program, a program replacement and/or insertion can be easily achieved and it is unnecessary to discard the final product on which the program is developed through a mask. Moreover, the program can be easily changed from an external device. This facilitates determining the cause of troubles occurring in the one-chip microcomputer incorporated in an electronic apparatus and hence improves reliability of the apparatus.

16 Claims, 33 Drawing Sheets

FIG. 10

| ADDRESS OF NON-VOLATILE MEMORY / RAM OF MICRO-COMPUTER | eNXTAD | ADDRESS TO BE SET TO EARih, EARib ~ EARi+2h, EARi+2b | |
|---|---|---|---|
| W | NXTAD0 → X | NOTE 1 | NOTE 2 |
| X | NXTAD1 → Y | add1i (UPPER-ORDER, LOWER-ORDER) ~ add1i+2 (UPPER-ORDER, LOWER-ORDER) | ──→ M ~ M+2 |
| Y | NXTAD2 → Z | add2i (UPPER-ORDER, LOWER-ORDER) ~ add2i+2 (UPPER-ORDER, LOWER-ORDER) | ──→ N ~ N+2 |
| Z | NXTAD3 → Y | add3i (UPPER-ORDER, LOWER-ORDER) ~ add3i+2 (UPPER-ORDER, LOWER-ORDER) | ──→ M ~ M+2 |

NOTE 1: DATA IS SET BY ROM AT POWER ON AND HENCE THE OPERATION IS UNNECESSARY FOR THE NON-VOLATILE MEMORY.

NOTE 2: FOR THE PROGRAM CODE, A CODE EQUIVALENT TO "CALL CHGSB" IS STORED.

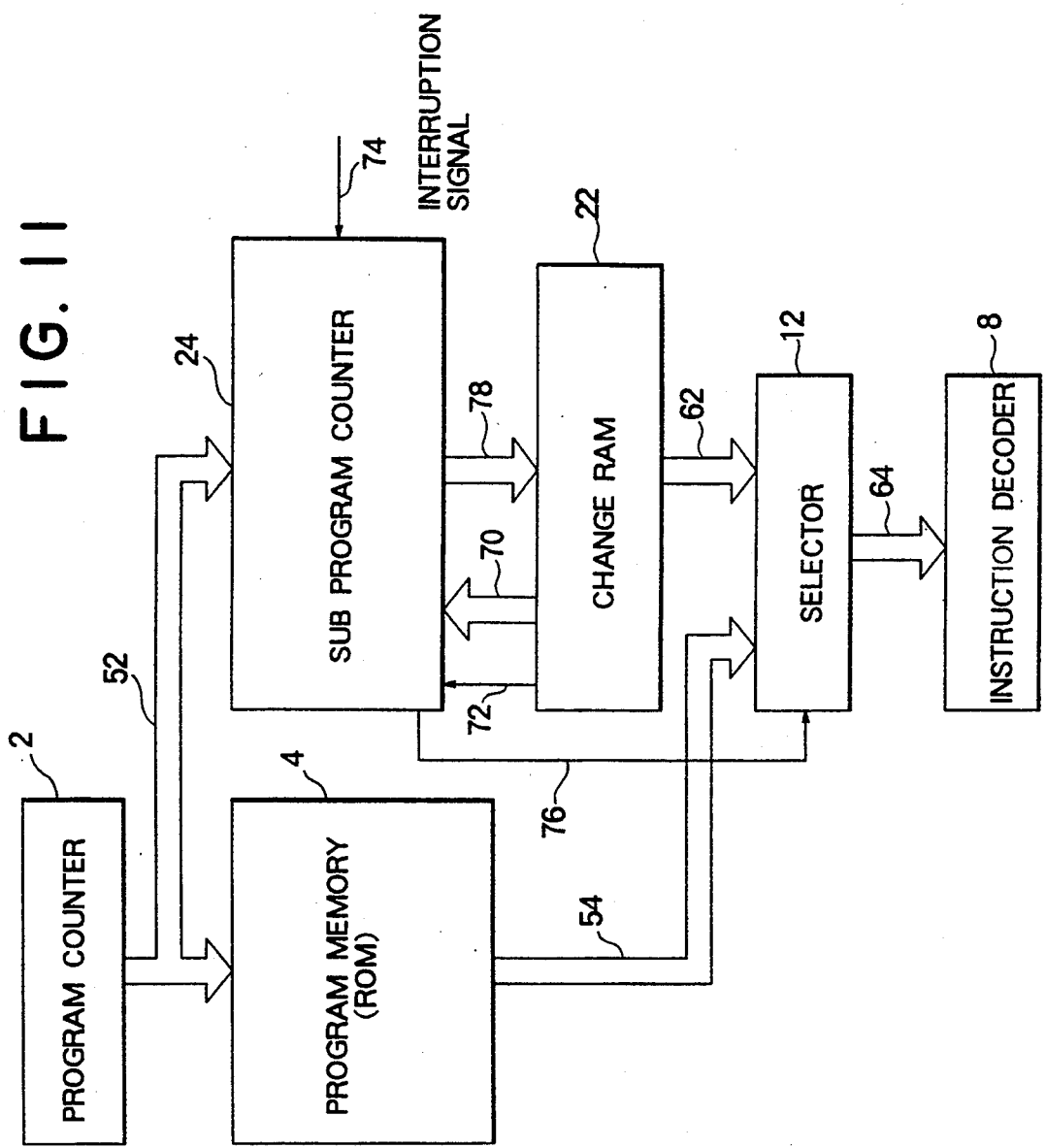

FIG. 16

| | ADDRESS DATA AREA | INSTRUCTION CODE AREA | SUB-INSTRUCTION DATA AREA |
|---|---|---|---|
| | 0 0 0 1 1 1 0 0 0 0 0 0 | 0 0 1 0 1 0 1 0 | 1 0 0 |
| | 0 0 0 1 1 1 0 0 0 0 0 1 | 0 0 0 0 1 0 0 0 | 0 0 1 |
| | 0 0 0 1 1 1 0 0 0 0 1 0 | 1 0 0 0 0 0 1 0 | 0 0 1 |
| PROGRAM TO BE INSERTED | 0 0 0 1 1 1 0 0 0 0 1 1 | 0 1 0 0 0 1 0 0 | 0 0 1 |
| | 0 0 0 1 1 1 0 0 0 1 0 0 | 0 1 1 0 1 1 0 0 | 0 0 1 |
| | 0 0 0 1 1 1 0 0 0 1 0 1 | 0 0 1 1 0 0 0 1 | 0 0 1 |
| | 0 0 0 1 1 1 0 0 0 1 1 0 | 0 1 0 0 0 1 0 1 | 1 1 0 |
| | 1 1 1 1 1 1 1 1 1 1 1 1 | 0 0 0 0 0 0 0 0 | 0 1 0 |
| UNUSED AREA | 1 1 1 1 1 1 1 1 1 1 1 1 | 0 0 0 0 0 0 0 0 | 0 1 0 |
| | 1 1 1 1 1 1 1 1 1 1 1 1 | 0 0 0 0 0 0 0 0 | 0 1 0 |
| | 0 0 1 0 0 0 0 0 0 0 0 0 | 1 1 0 0 1 0 0 0 | 0 0 0 |
| | 0 0 1 0 0 0 0 0 0 0 0 1 | 0 1 0 1 0 0 0 1 | 0 0 0 |
| PROGRAM TO BE REPLACED | 0 0 1 0 0 0 0 0 0 0 1 0 | 0 0 1 1 0 1 1 1 | 0 0 0 |
| | 0 0 1 0 0 0 0 0 0 0 1 1 | 1 1 1 1 0 0 0 0 | 0 0 0 |
| | 0 0 1 0 0 0 0 0 0 1 0 0 | 1 0 0 0 0 1 1 1 | 0 0 0 |
| | 0 0 1 0 0 0 0 0 0 1 0 1 | 0 1 0 1 0 1 1 0 | 0 0 0 |

EXAMPLE OF CONTROL CODES

| | |
|---|---|
| 0 0 0 | TO BE SIMPLY REPLACED |
| 0 0 1 | DURING INSERTION |
| 0 1 0 | INSERTION INHIBITED |
| 1 0 0 | INSERTION START |
| 1 1 0 | INSERTION END |

| CONTROL CODE AREA 93 | CONTROL CODE AREA 94 | CHANGE MODE |
|---|---|---|
| 0 | 1 | INSTRUCTION CODE TO BE REPLACED |
| 1 | 0 | STARTING ADDRESS FOR INSERTION MODE |
| 0 | 0 | ADDRESS OF INSERTING INSTRUCTION |

FLOW OF PROGRAM

FIG. 26

| PROGRAM MEMORY 58 | CHANGE INSTRUCTION CODE MEMORY | EXECUTION INSTRUCTION |
|---|---|---|
| OFE | * * * | |
| OFF | * * * | |
| * * * | ---→ 100 | REPLACED INSTRUCTION |
| * * * | ---→ 101 | REPLACED INSTRUCTION |
| * * * | ---→ 102 | BRL 100 |
| 100 | * * * | |
| 101 | * * * | |
| 102 | * * * | |
| 103 | * * * | |

FIG. 31
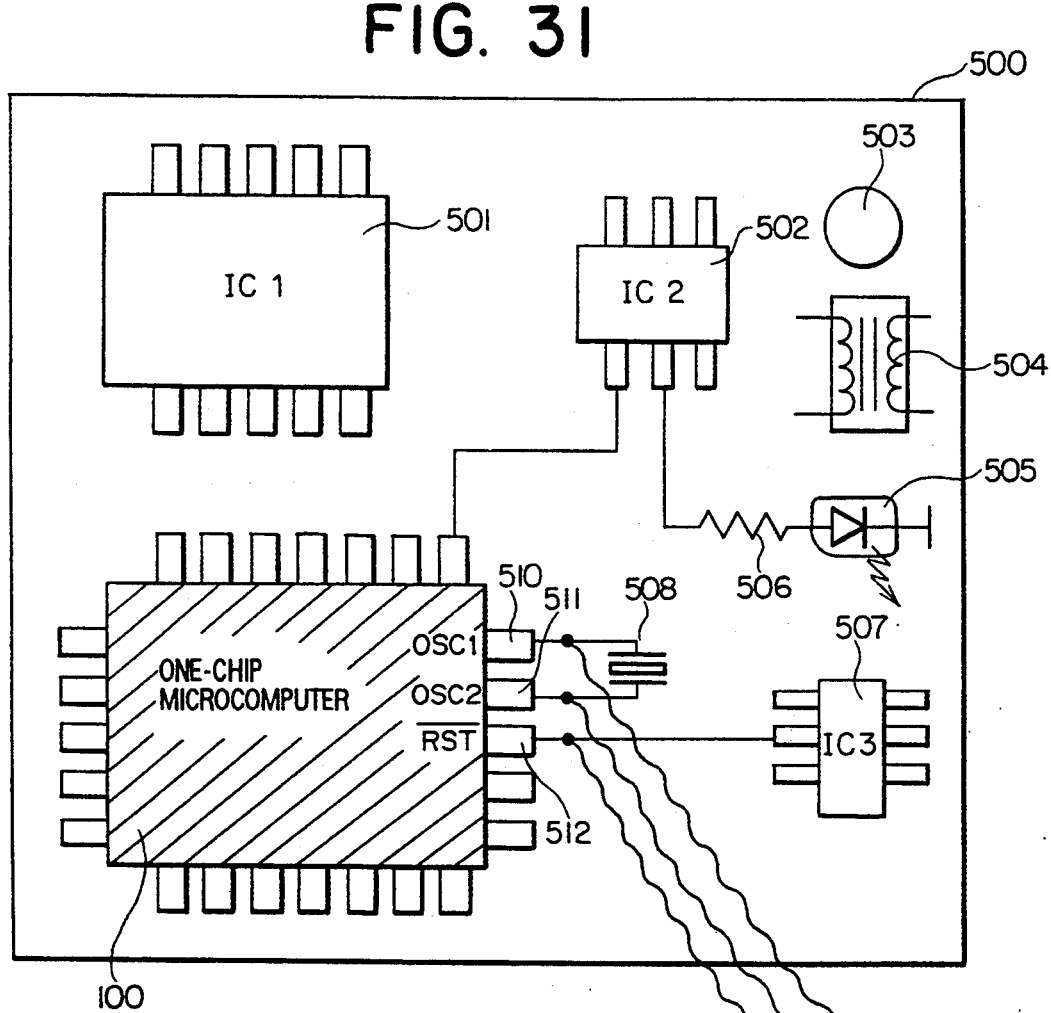
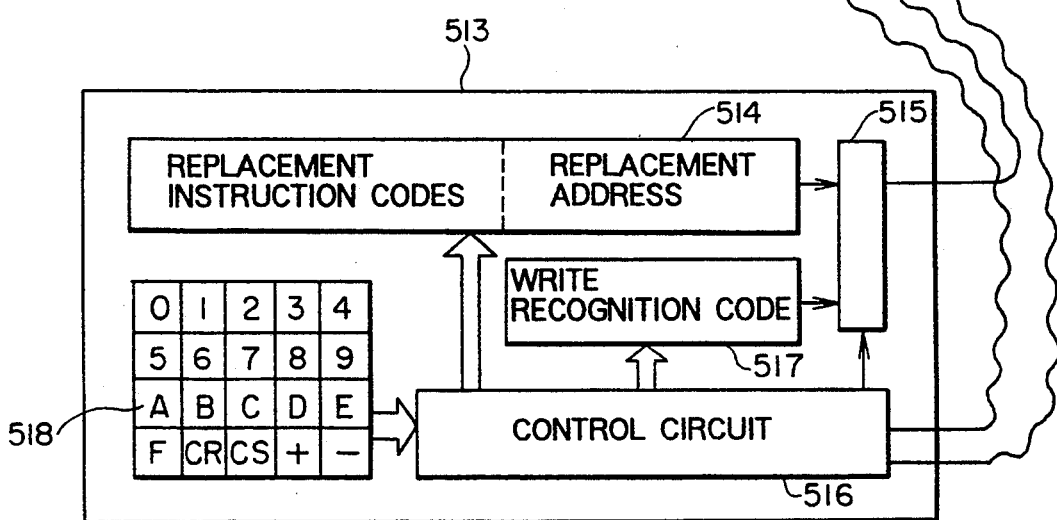

MICROCOMPUTER HAVING ROM TO STORE A PROGRAM AND RAM TO STORE CHANGES TO THE PROGRAM

BACKGROUND OF THE INVENTION

1. Field of the Invention

The present invention relates to a microcomputer in which data (the contents) of a program loaded in a read-only memory ROM developed or formed therein by use of a mask can be arbitrarily modified for execution thereof and to a microcomputer program modifying apparatus which produces modified program data for arbitrary program data in the read-only memory.

Moreover, the present invention relates to a microcomputer being incorporated in an electronic apparatus and having an integral ROM developed therein according to a mask, particularly to a microcomputer having no need to be separated nor removed from the apparatus for evaluation and test thereof.

2. Description of the Related Arts

Heretofore, a microcomputer formed in one chip generally includes, as shown in FIG. 35, a program memory PM in which programs are written, a program counter PC for sequentially specifying addresses of the program memory in accordance with a system clock signal, and an instruction decoder ID for transforming an instruction outputted from the program memory into an executable instruction signal.

Referring now to FIG. 35, description will be given of an example of a conventional one-chip microcomputer.

The one-chip microcomputer includes a program counter 602 for producing an output 652 representing an address, a program memory 604 fixedly fabricated therein by using a mask for receiving the output 652 to thereby generate an output 655 corresponding thereto, an instruction register 606 for receiving the output 655 to temporarily keep the output 655 therein and for thereafter delivering an output 656 when necessary, and an instruction decoder (ID) 608 for receiving the output 656 and converting the output 656 into an instruction signal to be executed.

Description will next be given of the operation of the microcomputer configured in one chip as above.

The program counter 602 having counted system clock signals, not shown, supplies the output 652, and then the program memory 604 sends as the output 655 data recorded at an address specified by the received output 652 to the instruction register 606, which in turn temporarily keeps the output 655 therein. At a proper timing thereafter, the register 606 feeds as the output 656 therefrom the stored signal to the instruction decoder 608. The decoder 608 then converts the output 656 into an executable instruction signal. The instruction signal also controls the internal operation of the one-chip microcomputer. The operations above are repeatedly accomplished to achieve the operation of the microcomputer.

As the program memory (PM), there is commonly employed a mask ROM (developed through a mask). The mask ROM is loaded with a program in a manufacturing process by the producer of the ROM; namely, it is impossible for the user to rewrite a desired program therein.

Moreover, after the one-chip microcomputer is produced, when a bug is found in the programs written in the mask ROM or when a portion of the program is preferable to be modified, the ROM mask pattern is required to be changed to thereby achieve the production process of the improved integrated circuit. Consequently, several months are required before the one-chip microcomputer thus modified is delivered to the user.

Under the conditions above, in order to solve the problems, there has been proposed in the JP-A-3-33926 a method in which a non-volatile memory is integrally disposed in a one-chip microcomputer to rewrite data therein, thereby modifying the program data.

According to this method, the user beforehand stores change address data and change instruction codes for modification in a non-volatile memory of the one-chip computer so that when an address outputted from the program counter matches the change address data specified for modification in the non-volatile memory, the change instructions are executed being decoded from the change instruction codes stored in the address of the memory addressed by the change address data.

FIG. 36 shows an example of a one-chip microcomputer including therein a non-volatile memory as described in the JP-A-3-33926.

The microcomputer of FIG. 36 includes, in addition to the components of the microcomputer shown in FIG. 35, an electrically writable non-volatile memory 610 for receiving the output 652 from the program counter 602 as an address when the program memory 604 developed by use of a mask receives the outputs 652 and a selector 612 for conducting a selection between an output from the non-volatile memory 610 and an output from the program memory 654 to supply the selected output to the instruction decoder 608.

In the non-volatile memory 610, there are beforehand stored change address data denoting addresses of the program memory 604 where program data to be rewritten are stored and change instruction codes to be replaced to the program data stored at the addresses.

When the address specified by the output 652 from the program counter 602 coincides with the change address data stored in the non-volatile memory 610, the selector 612 ignores the data of the program memory 604 and provides the change instruction codes from the non-volatile memory 610 to the instruction decoder 608.

In the one-chip microcomputer described above, program data developed through a mask therein can be replaced with arbitrary program data (change instruction codes) at each desired address. Consequently, in a case where a bug is found in the program of a mass-produced one-chip microcomputer or where a portion of the program is to be modified, the program can be altered without modifying the mask ROM. As a result, the production process needs not to be interrupted for the program modification.

However, in the one-chip microcomputer described in the JP-A-3-33926, there is required a process of integrally fabricating a non-volatile memory section such as an $E^2PROM$ or EPROM in the microcomputer.

In consequence, the manufacturing process becomes complicated and necessitates a large number of steps, leading to reduction of yielding. Due to the lowered yielding and necessity of a long period of time for production, the cost of the one-chip microcomputer soars.

Moreover, since change address data and change instruction codes which may be possibly changed in future are required to be entirely stored in the nonvolatile memory in advance, the capacity of the memory is necessarily increased. However, the capacity of the memory is not always completely used up, and hence there disadvantageously appear memory areas left unused therein.

To overcome this problem, Miyazawa has proposed in the JP-A-3-186927 an apparatus for changing programs of a microcomputer. The apparatus is a microcomputer system including an ROM, a program change RAM, a one-chip microcomputer operating according to program instructions stored in the ROM, and a non-volatile memory connected via a signal line to the one-chip microcomputer.

In the non-volatile memory, there are beforehand stored change addresses and change instruction codes for changing the program in the ROM. The one-chip microcomputer receives, according to a program including a plurality of instruction codes executed immediately following a reset operation at the power-on thereof, the change addresses and the instruction codes from the non-volatile memory to store the data in the program change RAM. The change address is then compared with the address denoted by the program counter. When these items are identical to each other, the stored instruction code is executed.

In the microcomputer system using the program change apparatus above, the non-volatile memory need not to be integrally formed in the one-chip microcomputer fabricated in the CMOS process. Consequently, the cost of the microcomputer system can be decreased.

However, since it is necessary to store in the program change RAM all data items including change addresses and change instruction codes which may possibly be altered in the operation later, the memory is required to have a capacity coping with the maximum volume of data items above. However, due to restriction of the area of the IC chip, the capacity of the RAM is also limited in many cases. Consequently, when the data items for modifications exceed the RAM capacity, the user is required to omit some modifications.

Moreover, in the conventional one-chip microcomputer, although a simple program data replacement can be achieved only at same addresses of the program fabricated by use of a mask, it has been difficult to insert therein a different number of instructions.

In an actual one-chip microcomputer, the program change or modification includes instruction insertion as well as data replacement. This insertion requirement, however, cannot be coped with by the conventional method.

Furthermore, when a trouble such as an erroneous operation occurs in the electronic apparatus in which the microcomputer is incorporated, it is impossible, with the one-chip microcomputer being incorporated in the apparatus, to implement the program modification as effective means for clarifying or deciding the cause of trouble. Consequently, a long period of time and a large amount of human work are required to examine and to determine the trouble, which leads to a problem that the reliable control of the electronic apparatus cannot be satisfactorily achieved.

SUMMARY OF THE INVENTION

It is therefore an object of the present invention to provide an apparatus for altering a program of a microcomputer in which the capacity of the RAM for modifying a program is decreased and an arbitrary capacity of program modification is allowed.

Another object of the present invention is to provide a microcomputer in which, for a program modification, a program insertion can be simply conducted in addition to a program replacement.

Still another object of the present invention is to provide a microcomputer in which a program of the microcomputer incorporated in an electronic apparatus can be changed with the microcomputer kept incorporated therein.

In accordance with a first aspect of the present invention, the microcomputer program change apparatus includes a non-volatile memory having change information store means for storing therein in combination change address data and change instruction codes for change of program instructions in a program read-only memory (ROM) and a one-chip microcomputer which operates according to program instructions stored in the program memory and which is connected to the non-volatile memory and stores the change address data and the change instruction codes received through a connecting line into a random access memory for program change, and compares by comparing means the address data with an address value designated by a program counter of the microcomputer, thereby executing instructions indicated by the change instruction codes when the comparison results in coincidence. The change information store means of the non-volatile memory includes a change storing section for storing, for each set constituted with a plurality of the change address data and the change instruction codes, change addresses of the program memory ROM to be exchanged with the change address data and the change instruction codes and change addresses of the non-volatile memory. The microcomputer includes a program means for changing a set of the change address data and the change instruction codes according to the change address when the change ROM address stored via the connecting line in the program change random-access memory matches the address value indicated by the program counter and inhibiting means for inhibiting the operation of the comparing means while data is being written in the program change random-access memory.

In a case where a bug is detected in the ROM program data of the one-chip microcomputer or where a portion of the program is to be modified, a plurality of sets each including change address data corresponding to addresses of the ROM and change instruction codes for program modification are stored in the non-volatile memory disposed in a location external with respect to the microcomputer. In a program executed immediately after the power-on of the microcomputer, one of the data sets is acquired from the non-volatile memory to be stored in the program change RAM through a serial communication. When the address data stored in the program change RAM matches the contents of the program counter, the change instruction codes stored in the program change RAM are outputted in place of the associated ROM data to the instruction decoder, thereby modifying the bug. When the number of locations to be modified exceeds the capacity of the program change RAM, an instruction code to call a program exchange subroutine is set in the program change RAM to be replaced according to an arbitrary ROM address such that when the program exchange subroutine is executed, the exchange address designating the next set of data stored in the non-volatile memory is referenced to write the change address data and the change instruction codes of the next set stored in the non-volatile memory onto the program change RAM of the one-chip microcomputer. Moreover, to prevent a wrong operation during the rewrite operation to change the original data into the change address data, the comparison between the change address data and the address designated by the program counter is inhibited.

In this structure, all items of the change address data and the change instruction codes prepare in the non-volatile memory for possible modifications in future are not necessarily stored in the RAM disposed in the one-chip microcomputer for changing instruction codes. Namely, for each set of modification, only the pertinent program portion can be changed, thereby changing the program data without any restriction on the RAM capacity in the microcomputer chip.

A microcomputer according to a second aspect of the present invention includes a first program counter for determining addresses of the read-only memory and a second program counter for calculating addresses of the change RAM. In the change RAM, there are stored change address data of addresses of the ROM where a replacement or an insertion is to be achieved, program data for the replacement or insertion at the addresses, and codes for controlling the second program counter. When the address specified by the first program counter matches the change address data stored in the change RAM, the program data in the ROM is replaced with the change instruction codes in the non-volatile memory according to the codes controlling the second counter, thereby executing the change instructions indicated by the change instruction codes.

In the constitution, by writing arbitrary data in the change RAM, there is obtained an advantageous effect, in addition to those attained according to the first aspect of the present invention, that the replacement and insertion can be conducted for the program data in the ROM fixedly formed through a mask.

A microcomputer in accordance with a third aspect of the present invention includes a read-only memory, an associative memory for storing change address data and change instruction codes in the form of a series of data items, an input terminal for receiving an external signal, an interface circuit operative in response to the external signal received by the input terminal for writing the series of data items in the associative memory, and a program counter for specifying an identical address for the program memory and the associative memory. There is further included means, operative when the address inputted from the program counter matches the address data contained in the series of data items written by the interface, for executing instructions represented by an output from the associative memory in place of an output from the read-only memory.

In the microcomputer according to the present invention, arbitrary data written in the associative memory in response to the external signal can be outputted in place of the signal sent from the program memory. The capacity of the change memory in the chip can be decreased, and moreover, replacement and insertion of the change program data can be effected for the program data in the program memory. In addition, with the microcomputer as the final product incorporated in the electronic apparatus, the program data can be altered. This facilitates the program data change which helps analyzing troubles in the electronic apparatus.

BRIEF DESCRIPTION OF THE DRAWINGS

These and other objects and advantages of the present invention will become apparent by reference to the following description and accompanying drawings wherein:

FIG. 10 is a table for illustrating data stored in the non-volatile memory which contain change addresses and data to be set to the program RAM, etc.;

FIG. 11 is a block diagram showing the constitution of an embodiment of a one-chip microcomputer according to the second aspect of the present invention;

FIG. 16 is a diagram showing an example of data to be written in the change RAM;

FIG. 26 is a schematic diagram showing a program flow in relation to the timing chart of FIG. 25;

FIG. 31 is a diagram for explaining a configuration example in which the present invention is applied to an actual microcomputer system;

DESCRIPTION OF THE PREFERRED EMBODIMENTS

[Embodiment 1]

Figure 1:
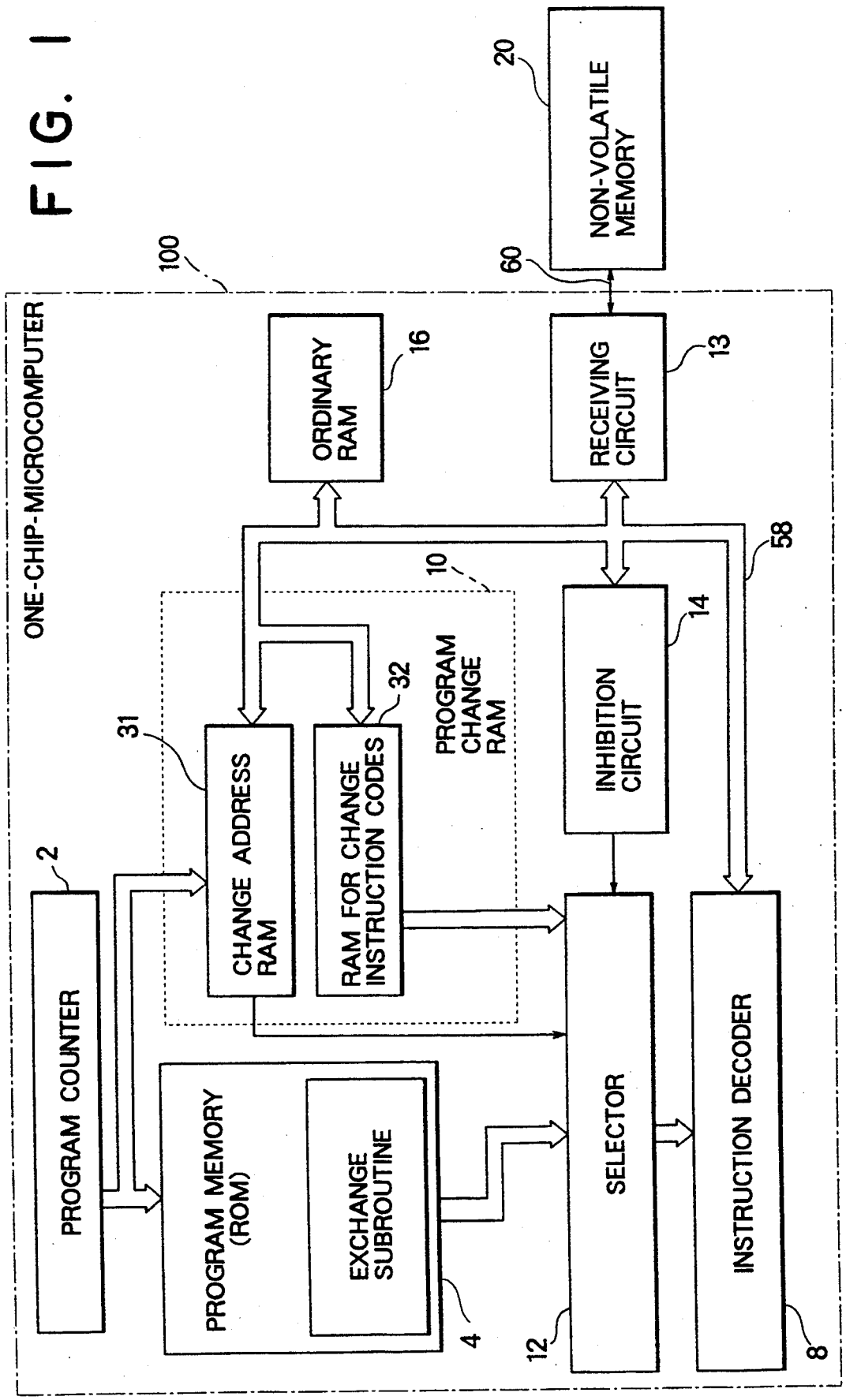
FIG. 1 is a diagram showing the overall configuration of an embodiment of a one-chip microcomputer according to the present invention.

Referring to FIG. 1, description will be given of the concept of the apparatus for changing a program of a microcomputer according to the present invention. A microcomputer system shown in FIG. 1 includes a one-chip microcomputer 100, a non-volatile memory 20 which is disposed at a position external with respect to the microcomputer 100 and which is loaded with all data items to be set to the microcomputer 100, and a signal line 60 (such as a serial communication line) for connecting the microcomputer 100 to the non-volatile memory 20.

The one-chip microcomputer 100 includes a program counter 2, a mask read-only memory (ROM) 4 in which a main program and subroutines such as a subroutine to exchange programs are fixedly written, a program change random-access memory (RAM) 10, a selector 12, an instruction decoder 8, and a receiving circuit 13 for receiving data from the non-volatile memory 20 typically through a serial communication, the circuit 13 being connected via the signal line 60 to the non-volatile memory 20. Reference numerals 14 and 16 respectively stand for an inhibition circuit to inhibit operation of the selector 12 and an ordinary RAM.

The program counter 2 is connected not only to the ROM 4 but also to the RAM 10 for change instruction codes to supply an address value thereto.

The program change RAM 10 includes a change address RAM 31 and a change code RAM 32 for respectively storing therein change address data associated with an address at which program data (or instructions) to be modified is stored in the ROM 4 and change instruction codes for the replacement, when a bug is found in the program written in the ROM 4 or when a portion of the program is desired to be altered. The change address data and the change instruction codes are written as follows. Namely, data stored in the non-volatile memory 20 is sent therefrom by a program executed immediately after a reset at the power-on operation of the one-chip microcomputer 100 so as to be written in the program change RAM 10 via the receiving circuit 12. This means that the contents of the program change RAM 10 are substantially equal to those of the non-volatile memory 20.

The selector 12 selects, in an ordinary case, data outputted from the ROM 4 and then feeds the data to the instruction decoder. However, in a case where the change address data stored in the change address RAM 31 matches the address specified by the program counter 2, if change instruction codes are outputted from the change code RAM 32 for change instruction codes in this constitution, the selector 12 selects the output data (modified program data) from the change code RAM 32 in place of the output data from the ROM 4 to input the selected data to the instruction decoder 8.

The inhibition circuit 14 inhibits the operation of the selector 12. While an inhibit signal is being outputted therefrom, even when the address data stored in the change address RAM 31 matches the address specified by the program counter 2, the program data from the ROM 4 are ordinarily delivered to the instruction decoder 8.

While the program data is being inputted from the ROM 4 to the instruction decoder, it is possible to conduct replacement of data from the program change RAM 10.

The inhibition circuit 14, the receiving circuit 13, and the program change RAM 10 are connected to a bus 58 so as to conduct associated operations according to instructions from the instruction decoder 8.

The non-volatile memory 20 may be implemented, for example, by an electrically writable memory such as an electrically erasable programmable ROM (EEPROM), an electrically programmable ROM (EPROM), or an ROM.

Figure 2:
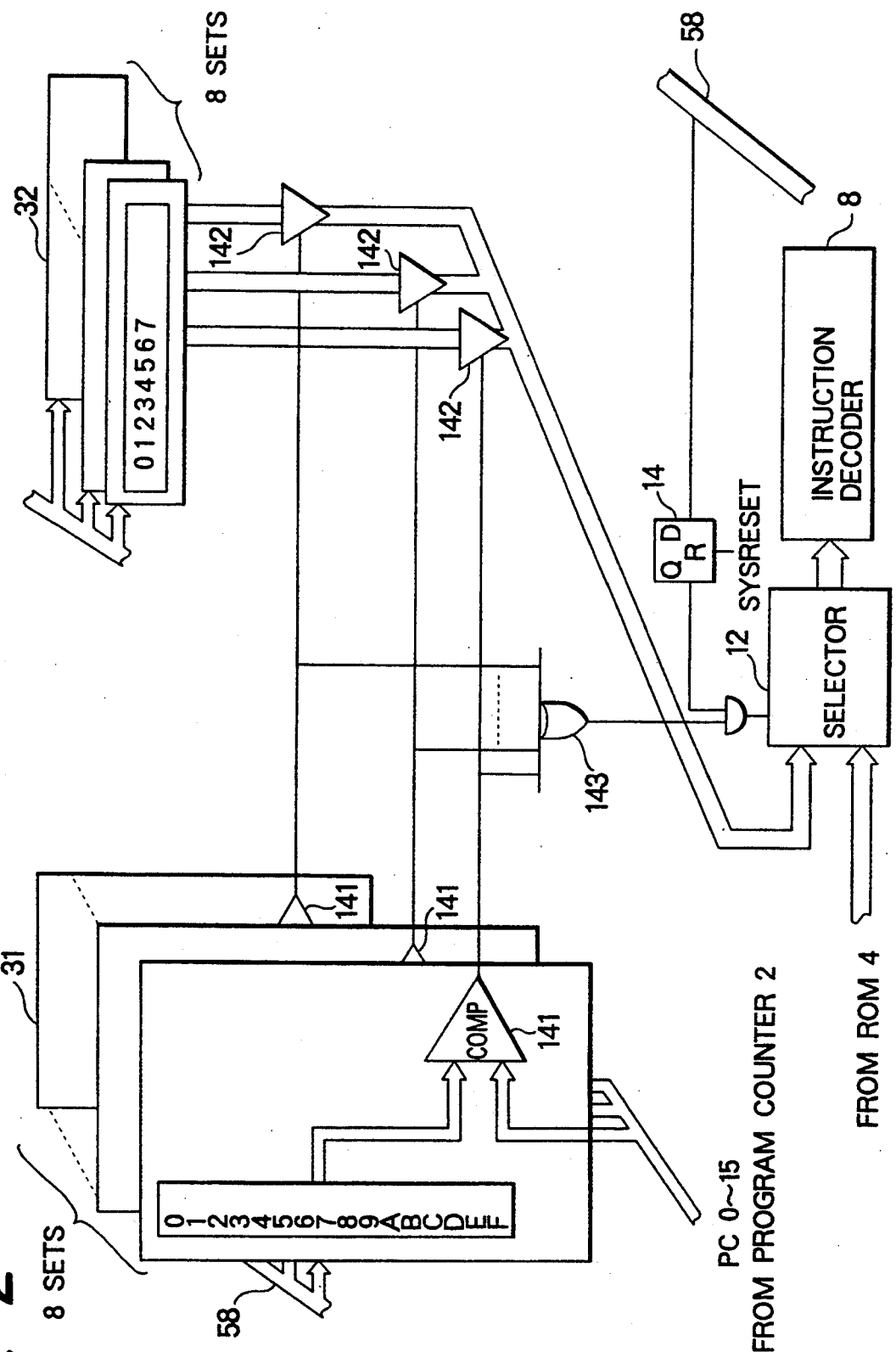
FIG. 2 is a diagram showing in detail relationships between an RAM for change instruction codes, a selector, and an inhibition circuit.

FIG. 2 shows in detail relationships between the program change RAM 10, the selector 12, and the inhibition circuit 14. Although the program counter 2 includes 16 bits in the configuration, the idea of the system is not restricted by the number of bits of the program counter 2. Moreover, there are disposed eight change address RAMs 31 and eight change code RAMs 32 for change instruction codes. Each change code RAM 32 has a memory related to the number of bits equal to that of an instruction code, namely, eight bits in this case. Naturally, for a 10-bit long instruction, it is only necessary for the change code RAM 32 to have a 10-bit memory. The change address RAMs 31 and the change code RAMs 32 are connected to the bus 58 and hence the contents of each thereof can be rewritten by an RAM write instruction (not shown) decoded by the instruction decoder 8. In this constitution, moreover, during the rewrite operation, when an inhibit instruction similarly decoded by the instruction decoder 8 is effected to supply an inhibition signal from the inhibition circuit 14 to the selector 12, the data selection of the change code RAM 32 is inhibited.

The inhibition circuit 14 produces an inhibition signal in response-to a system reset (SYSRESET) signal created in response to the power-on operation of the system. Furthermore, on receiving a microcomputer instruction to set data via an input/output bus 58 to the inhibition circuit 14, the circuit 14 continues outputting the inhibition signal until an instruction is received to change the inhibition signal to a grant signal.

Each change address RAM 31 is connected to a comparator (COMP) circuit 141 such that when the address indicated by the program counter 2 matches the change address data of the change address RAM 31, a gate 142 connected to the associated change code RAM 32 is opened to output change instruction codes from the change code RAM 32. At the same time, when the value of any one of the change address RAMs 31 coincides with the address denoted by the program counter 2, only if the inhibition circuit 14 is not outputting an inhibition signal, the selector 12 is controlled by an output from an OR circuit 143 to send change instruction codes from the change code RAM 32 to the instruction decoder 8.

Figure 3:
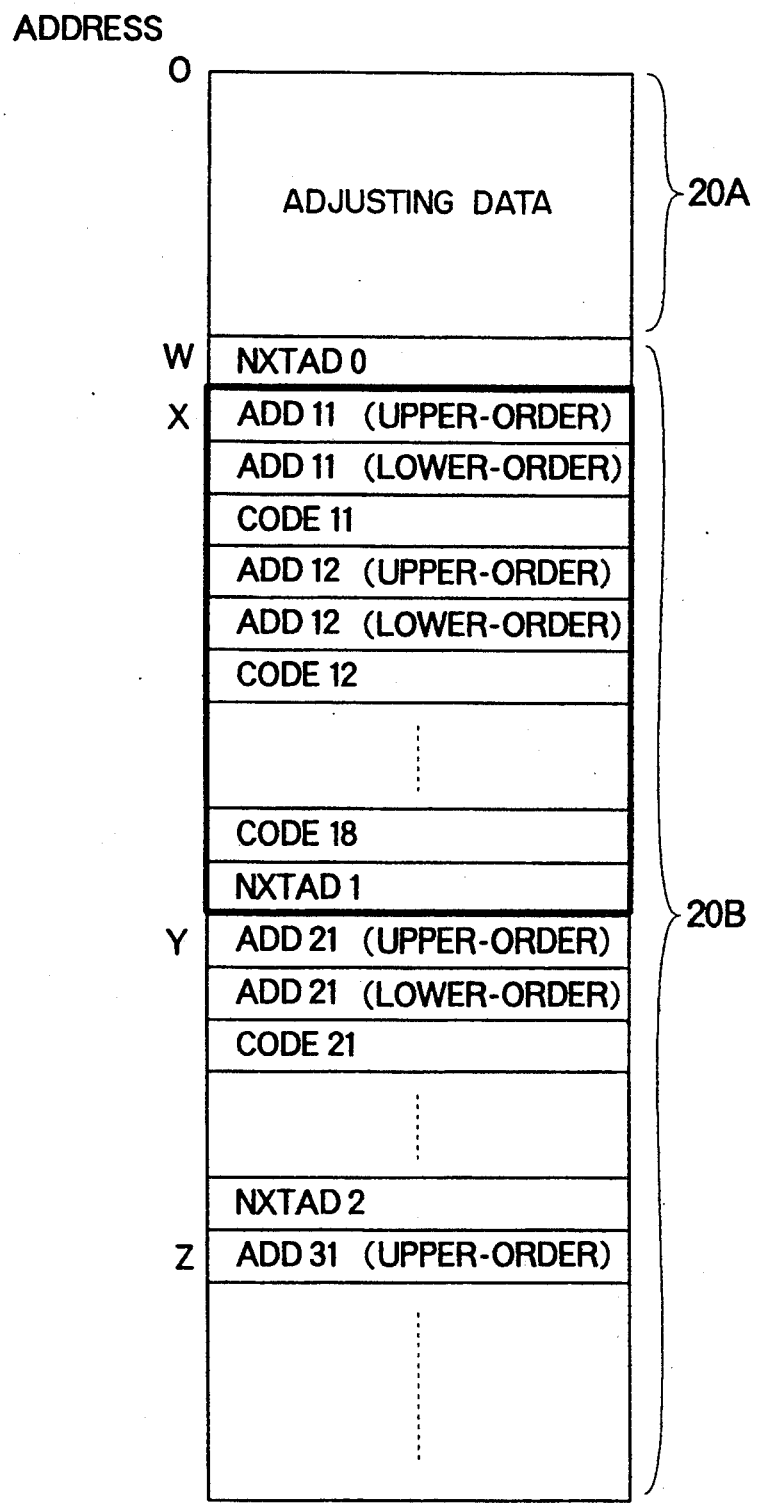
FIG. 3 is a schematic diagram for explaining an address map of a non-volatile memory.

FIG. 3 shows an example of an address map of the non-volatile memory 20. Namely, the memory 20 includes an adjusting data area 20A ranging from the start address thereof to a predetermined address. In this area, there are stored, for example, various kinds of data items for an automatic focusing (AF) mechanism and an automatic exposure (AE) mechanism of a camera system. The remaining address area is allocated as a program change data area 20B. In the area 20B, letters X to Z are 8-bit variables respectively denoting addresses of the non-volatile memory 20. Moreover, NXTAD, addjk, and codejk (i, j, and k are arguments of positive integers) are variable names designating addresses of the non-volatile memory 20 for groups represented as addik to NXTADj, data to be set to the change address RAM 31, and data to be set to the change code RAM 32, respectively. In this example, a consecutive 25-byte memory representatively indicated as addjl, codejl to NXTAD1 is assumed to be a group, namely, a set. For example, in FIG. 3, the contents of an area from the address X, namely, from addll to NXTAD1 is called a set.

Since the program counter 2 includes 16 bits, addjk occupies two bytes including a upper-order field and a lower-order field to cope with the program counter 2. For the 8-bit instruction, codejk need only include one bit. In this example, the address W denotes the position of the variable NXTAD0, whereas the letters X, Y, and Z respectively indicate the first positions add11, add21, etc. of the associated groups.

Figure 4:
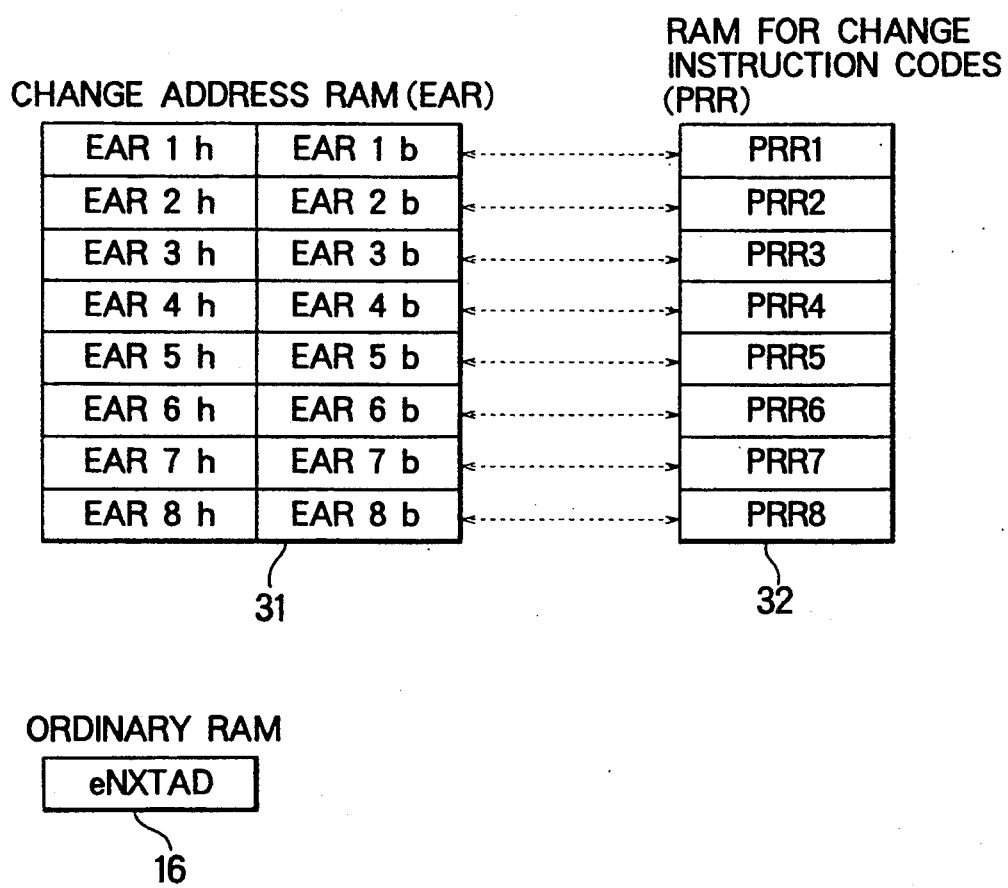
FIG. 4 is a diagram useful to explain a memory map of the RAM for change instruction codes in the one-chip microcomputer.

FIG. 4 shows a memory map of the program change RAM 10 of the one-chip microcomputer. Since the program counter 2 includes 16 bits, the change address RAM 31 is required to be constituted with two bytes. Assume that the first upper-order address data has a variable name EAR1$h$ and the first lower-order address data possesses a variable name EAR1$b$; moreover, the program RAM 32 related thereto has a variable name PRR1. There are assumed eight variable address positions ending with those having variable names EAR8$h$, EAR8$b$, and PRR8, respectively.

A memory of a variable name eNXTAD is referenced when an exchange subroutine, which will be described later, is called by an instruction altered in the program change RAM 10. This memory is denoted by an address of the ordinary RAM 16 containing therein an address of the non-volatile memory 20, the address designating the first position of a set of the next change data for the data replacement or exchange.

Figure 5:
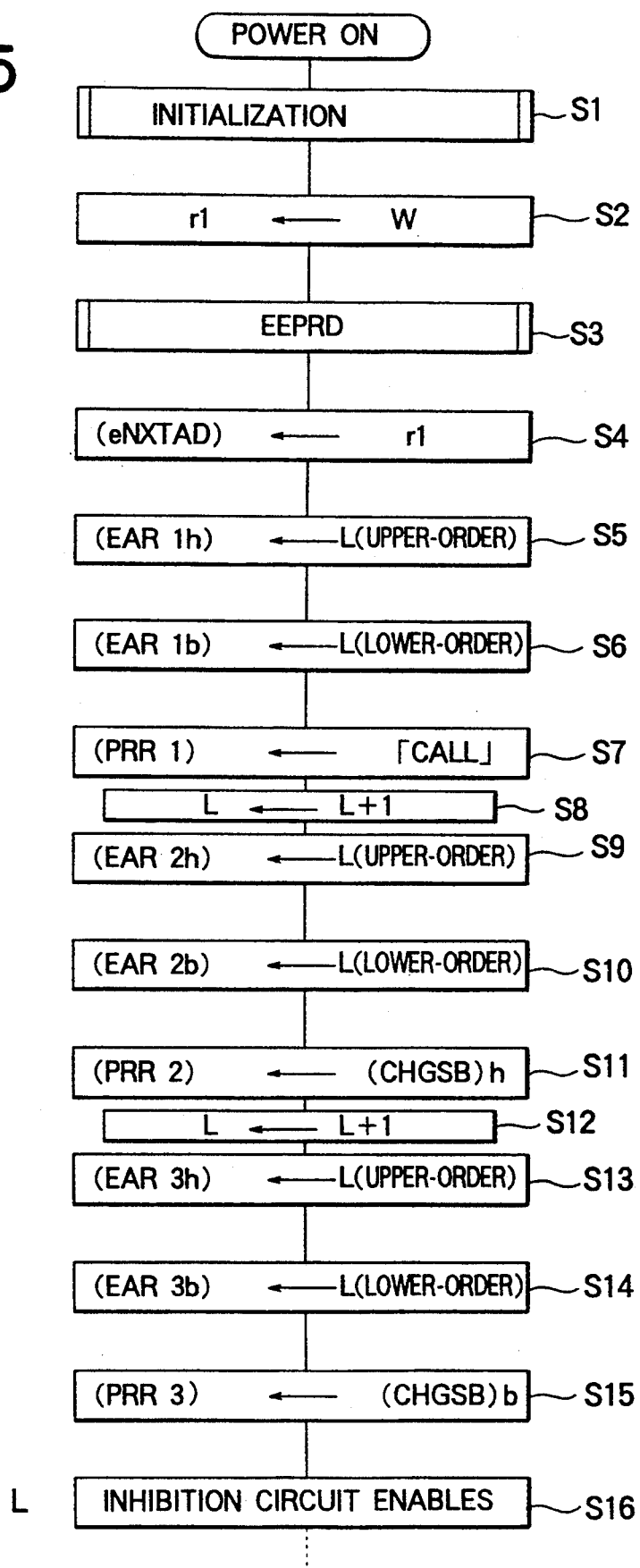
FIG. 5 is a flowchart showing the operation to set data in the RAM for change instruction codes.

Subsequently, referring to the flowchart of FIG. 5, description will be given of the operation in the construction in which data is set to the program change RAM 10 when the system is powered. In a power-on operation, the system is reset to start the program from the power-on point. In this situation, the inhibition circuit 14 outputs an inhibition signal in response to the system reset.

First, in a step S1, the ports and other elements of the one-chip microcomputer 100 are initialized. After the initialization is completed, there is executed a program to set the program change RAM 10. That is, in a step S2, an address W of NXTAD0 indicating the first address of a group of the non-volatile memory 20, which includes data to be set-to the program change RAM 10, is set to a register r1, not shown, in the microcomputer 100. Control is then passed to a step S3. In this regard, the address W is determined when the system is designed and hence can be written in the ROM 4 in advance.

Figure 6:
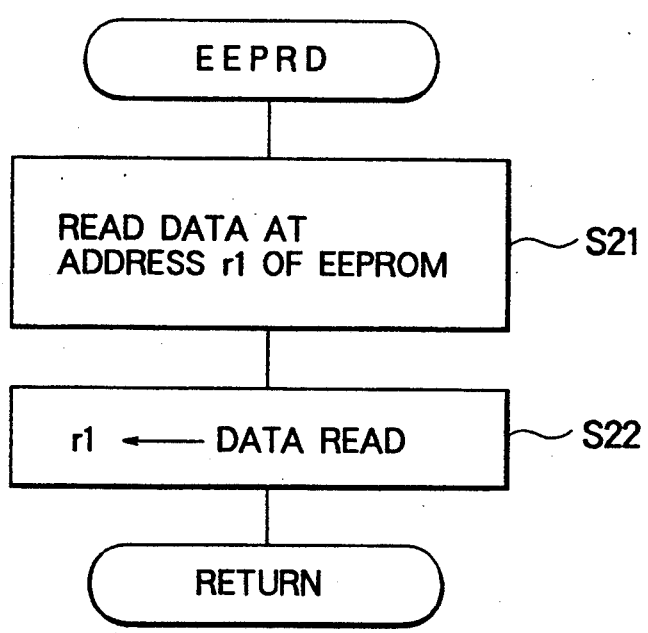
FIG. 6 is a flowchart showing the operation of a subroutine to read data from the non-volatile memory.

In the step S3, the system calls a subroutine EEPRD to call data from the non-volatile memory 20. In this description, the memory 20 is assumed to be implemented by an electrically erasable programmable ROM (EEPROM). The subroutine EEPRD operates as shown in FIG. 6. First, in a step S21, the program reads via the receiving circuit 13 data stored at an address of the non-volatile memory 20 denoted by the value of the register r1. Next, in a step S22, data resultant from the read operation of the step 21 is set to the register r1.

Next, in a step S4, the result of the read operation from the non-volatile memory 20, namely, the value of the register r1 (NXTAD0) is stored in the field eNTAD of the ordinary RAM 16.

Subsequently, the program sets a CALL instruction to call an exchange subroutine CHGSB, which will be described later, to be loaded in the program change RAM 10. After the data is set to the program change RAM 10, the exchange subroutine may be executed at an arbitrary address preceding the address to be actually modified. In this case, an address L immediately following the instruction which has set the data to the program change RAM 10 is used to execute the exchange subroutine. Assume that the call statement for the exchange subroutine includes a three-byte instruction constituted with a one-byte call code and a two-byte address denoting the exchange subroutine.

More specifically, in a step S5, the upper-order value of the address L is set to EAR1$h$ of the change address RAM 31. In a step S6, the lower-order value of the address L is set to EAR1$b$ of the change address RAM 31. In a step S7, a code associated with the call is set to PRR1 of the change code RAM 32. Next, in a step S8, the value of the address L is incremented by one. In a step S9, the upper-order value of the address L is set to EAR2$h$ of the change address RAM 31. In a step S10, the lower-order value of the address L is set to EAR2$b$ of the change address RAM 31. In a step S11, the upper-order value of the address of the exchange subroutine CHGSB is set to PRR2 of the change code RAM 32. Subsequently, in a step S12, the value of the address L is incremented by one. In a step S13, the upper-order value of the address L is set to EAR3$h$ of the change address RAM 31. In a step S14, the lower-order value of the address L is set to EAR3*b* of the change address RAM 31. In a step S15, the lower-order value of the address of the exchange subroutine CHGSB is set to PRR3 of the change code RAM 32.

Thereafter, in a step S16, a grant signal is outputted from the inhibition circuit 14 to set the selector 12 in an enabled or effective state. Consequently, when the content of the program counter 2 indicates thereafter the address L, the selector 12 selects the value of the change code RAM 32 to replace the value with the code of the ROM 4, thereby executing the exchange subroutine CHGSB.

Figure 7:
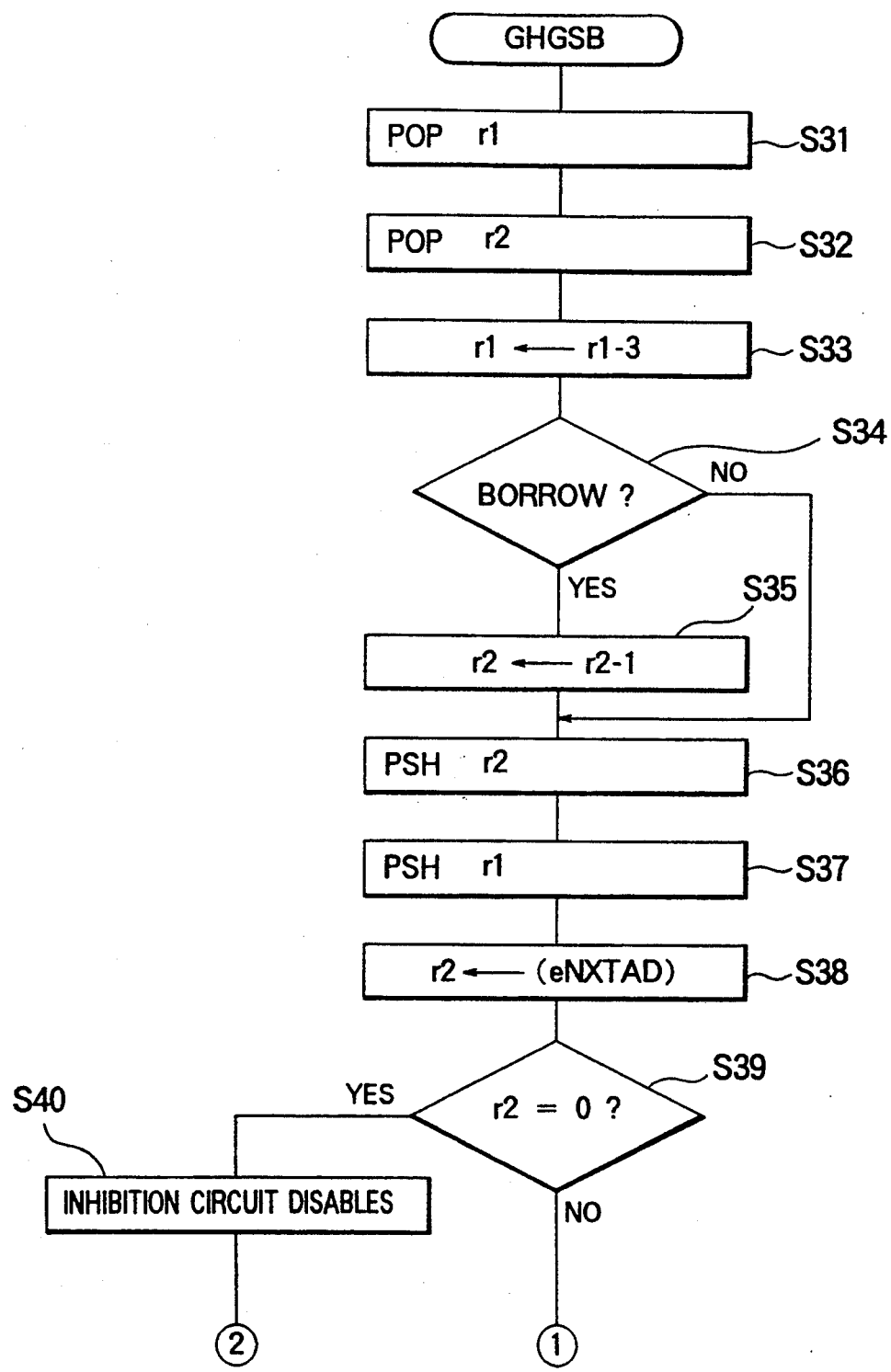
FIG. 7 is a flowchart showing the first part of operation of a subroutine to exchange programs.
Figure 8:
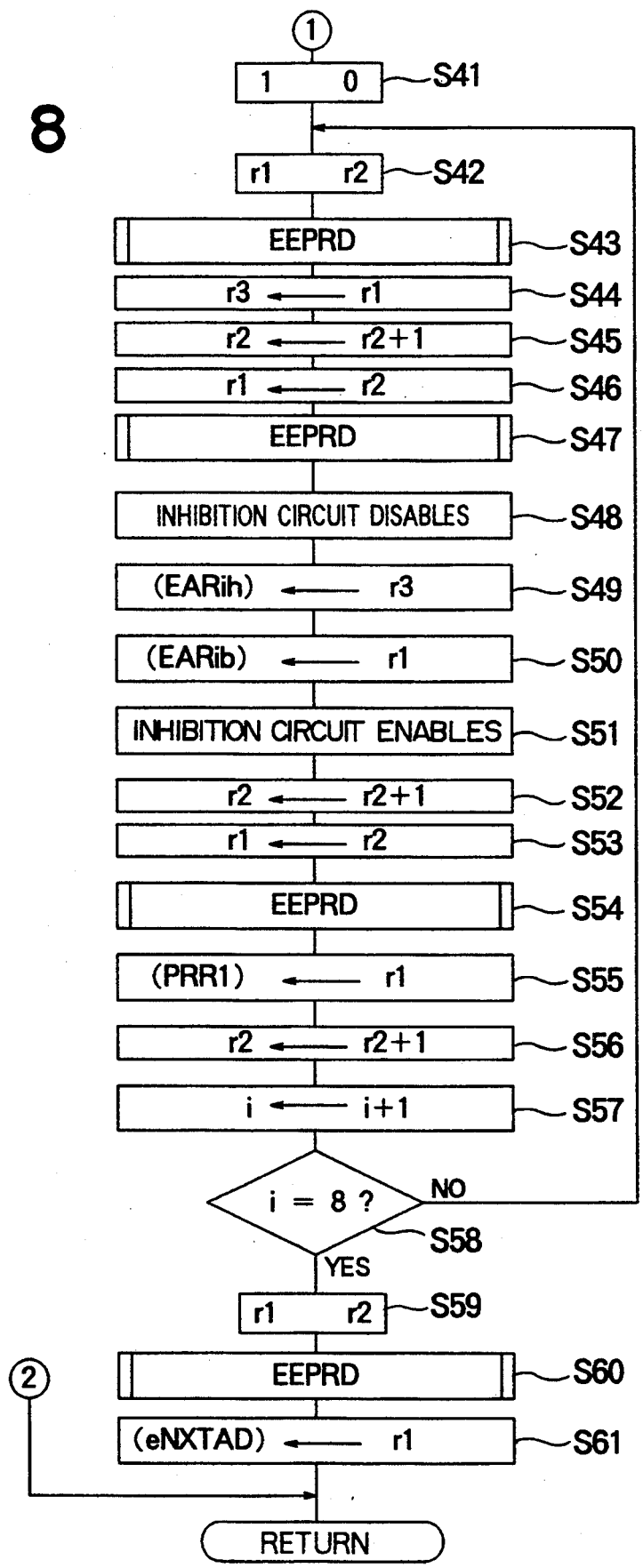
FIG. 8 is a flowchart for explaining the last part of operation of the program exchange subroutine.

FIGS. 7 and 8 are flowcharts showing an example of the exchange subroutine CHGSB. Referring now to the flowcharts, the operation of the exchange subroutine will be described. First, in the subroutine CHGSB, to execute the program of the ROM 4 which has been skipped because of the execution of the program change RAM 10, the return address of the exchange subroutine CHGSB is decremented by three bytes. In an ordinary microcomputer, control is to be passed to an address indicated by a stack pointer at an execution of a return instruction. Consequently, the operation above is achieved as follows. The value of the stack pointer is acquired and then is decremented by three (bytes) so as to restore the resultant value to the stack pointer. In this case, registers r1 and r2 each are assumed to be 8-bit registers.

More concretely, in steps S31 and S32, the value of the stack pointer is obtained to be set to the registers r1 and r2, and control is transferred to a step S33. In the step S33, three is subtracted from the value of the register r1 and the processing proceeds to a step S34. In this step, the program judges to determined if a borrow occurs as the result of the subtraction. If this is the case, a step S35 is executed; otherwise, a step S36 is effected. In the step S35, the value of the register r2 is decremented by two to pass control to steps S36 and S37. Namely, the values of the registers r1 and r2 are restored to the stack pointer, thereby passing control to a step S38.

In the step S38, data is read from eNXTAD to be set to the register r2, and then control is transferred to a step S39. In this step, a check is made to decide whether or not the value of the register r2 is 0. If it is the case, it is assumed that there does not exist any location to be modified, and hence control is passed to a step S40. In the step S40, the output from the inhibition circuit 14 is changed to be an inhibition signal, and then a return instruction is executed. In this situation, the contents of the stack point have been restored to the address L and the selector 12 is in the inhibited state. Consequently, the system executes the original instruction at the address L of the ROM 4.

In this connection, it is determined that there does not exist any location to be modified when data of eNXTAD (=NXTAD0) is 0 for the following reason. Namely, in the address map of this system, the address 0 is used for adjusting data. In other systems, it is only necessary to employ address data or the like which is not used as data to be changed when the system is designed. Consequently, any value other than zero may be used in this case.

In the step S39, if the value of the register r2 is other than 0, namely, eNXTAD≠0, it is assumed that there exists a location to be modified. In the next step, the contents of the program change RAM 10 are replaced.

In this embodiment, there are stored in the non-volatile memory 20 the contents of the upper-order and lower-order fields of change address data and data of change instruction codes for each of the eight groups and an address denoting the next set in the non-volatile memory 20. Consequently, data items are sequentially read, by incrementing the value of register r2, from the non-volatile memory 20 indicated by eNXTAD assigned to the register r2 so as to set the obtained data items to EARih and EARib of the change address RAM 31 and PRRi of the change code RAM 32.

That is, first, in a step 41, the value of a register, not shown, of the microcomputer is set to 0, and then control is passed to a step 42. In this step, the value of the register r2 is set to the register r1. In a step S43, a subroutine EEPRD to read data from the non-volatile memory 20 is called to be executed, thereby transferring control to a step S44. In this step, the value of the register r1 is set to a register r3, not shown, of the microcomputer. In a step S45, the value of the register r2 is incremented by one, and then the processing is proceeded to a step S46. In this step, the value of the register r2 is set to the register r1. In a step S47, the subroutine EEPRD to read data from the non-volatile memory 20 is again called to be executed. In this situation, when data is set to the change address RAM 31, the output from the inhibition circuit 14 is changed to be an inhibition signal in a step S48 to fix the input to the selector 12 to the side of the ROM 4 for the following reason. Namely, the rewrite operation of the change address RAM 31 can be achieved only in the unit of eight bits. Consequently, for example, during a rewrite operation of EARih, when the combination address related to EARib by chance matches the address of the exchange subroutine CHGSB, there may possibly occur a wrong operation if the provision above is not present.

Subsequently, in a step 49, the value of the register r3 is set to EARih of the change address RAM 31. In a step 50, the value of the register r1 is set to EARib of the change address RAM 31, thereby passing control to a step S51. In this step, the output from the inhibition circuit 14 is changed to be a grant signal. In the next step S52, the value of the register r2 is incremented by one. In a step S53, the value of the register r2 is set to the register r1. In a step S54, the subroutine EEPRD to read data from the non-volatile memory 20 is again called for execution thereof. In a step S55, the value of the register r1 is set to PPRi of the change code RAM 32. In a step S56, the value of the register r2 is incremented by one. In a step S57, the value of the register i is incremented by one. In a step 58, a check is made to determine whether or not the value of the register i is eight. If this is not the case, control is returned to the step S42 to repeatedly conduct the operations above.

In the step S58, if the value of the register i is equal to eight, it is assumed that the set of change address data, namely, the entire eight groups have completely been changed and then control is passed to a step 59. In this step, the value of the register 2 is set to the register r1. In a step S60, the subroutine EEPRD to read data from the non-volatile memory 20 is again called to be executed. In the subsequent step S61, the value of the register r1, namely, data of NXTADi is set to eNXTAD and is then a return instruction is achieved. In this operation, the change address data in the program change RAM 10 for a call of the exchange subroutine CHGSB has already been replaced with other data as described above. Consequently, since the stack data is decremented by three bytes, the ROM data altered to execute the exchange subroutine CHGSB can be executed when the control is thus returned. In consequence, the exchange ROM address (M,N) to be set to the program change RAM 10 for execution of the exchange subroutine CHGSB can be allocated at an arbitrary position. When the number of positions to be modified is equal to or less than eight, the data exchange need be accomplished only once. Accordingly, it is only necessary that all of eight bytes (assigned for each set) are used for the program change and a value 0 is set to NXTADi.

Furthermore, if the locations for modification exceeds eight, the contents of the program change RAM 10 are required to be exchanged. In this case, it is only necessary to reserve three bytes of any location to be modified for the call statement to call the exchange subroutine CHGSB. In this situation, the area of the location is reduced as 8−3=5 bytes. However, for the location related to the modification not exceeding ten bytes, there is required only one exchange. Moreover, up to 15 bytes can be modified through two exchange operations.

Figure 9:
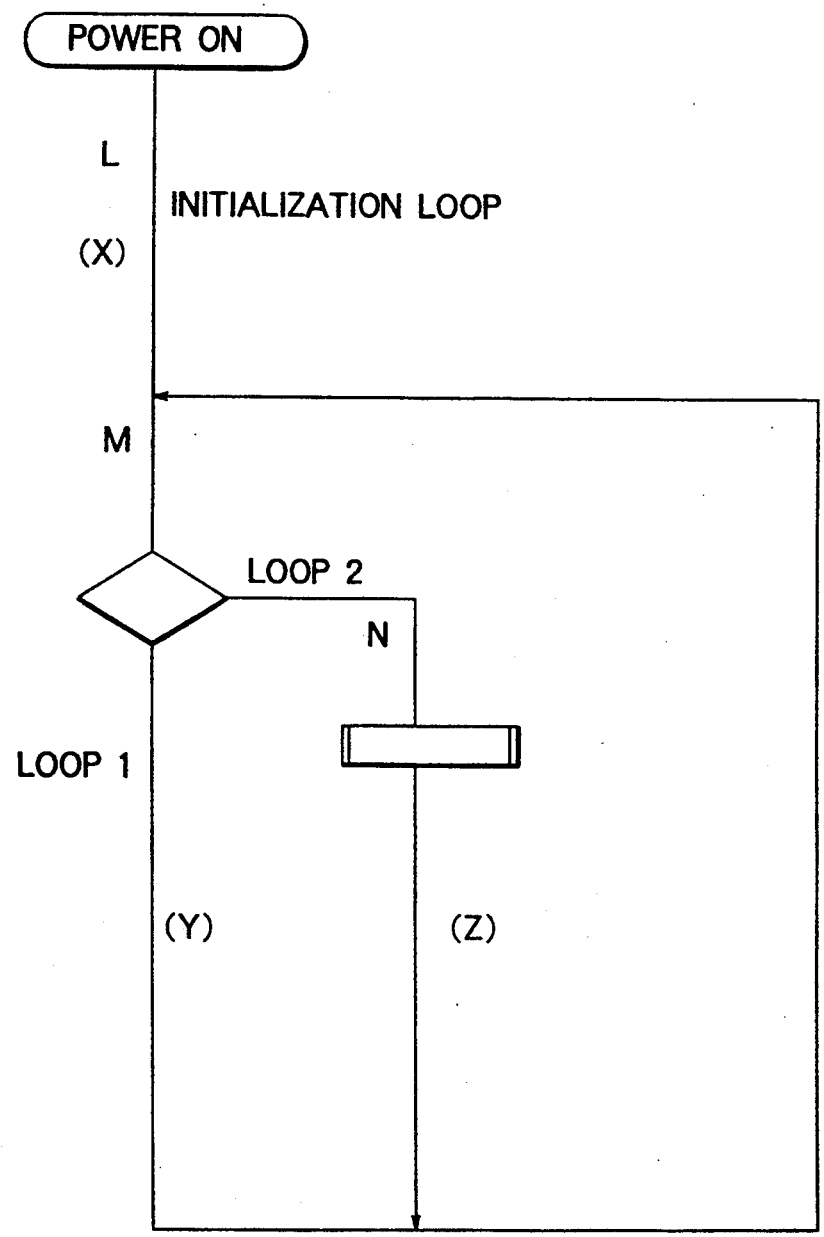
FIG. 9 is a diagram useful to explain an example of an image of the program exchange operation.

Referring to FIG. 9, description will be briefly given of an example of the program exchange operation. Assume, for example, that the initialization takes place in a period of time ranging from the power-on of the system to when control reaches an address M and an address X is to be altered in this period in the non-volatile memory 20. The program is assumed to be constituted with a loop 1 (main loop) and a loop 2 to which control branches from the loop 1, for example, in response to an input from a switch. It is assumed that a group of an address Y and a group of an address Z are to be changed in the non-volatile memory 20 respectively in the loops 1 and 2. FIG. 10 shows data of the non-volatile memory 20 to be set to the change address RAM 31, the change code RAM 32 for change instruction codes, and eNXTAD in this case.

As above, the operation of the selector 12 is inhibited when necessary, not only after the reset operation, so as to arbitrarily change the contents of the program change RAM 10 at appropriate change addresses. Resultantly, it is possible in principle to alter the contents of an arbitrary number of locations within an allowable range of the capacity of the non-volatile memory 20. Moreover, when it is unnecessary to modify all of an objective set of data, an arbitrary address need only be selected to write the code of ROM 4 in the program change RAM 10, thereby coping with the smaller number of locations to be modified in the identical hardware configuration.

As described in detail above, according to the present invention, a plurality of sets of modification programs are stored in an external non-volatile memory; moreover, there is disposed in the main program of the microcomputer an exchange subroutine to move the contents of each set from the non-volatile memory onto the program change RAM, and there is included in the modification program an instruction to call the exchange subroutine. This resultantly provides an apparatus for changing a program in a microcomputer in which without increasing the capacity of the program change RAM of the microcomputer, the program modification can be achieved beyond the capacity of the program change RAM.

Moreover, as compared with the conventional technology, the capacity of the program change RAM can be minimized. Consequently, the number of process steps is reduced, and the production cost is lowered.

[Embodiment 2]

Referring to FIG. 11, description will be given of the constitution of a one-chip microcomputer in an embodiment according to the second aspect of the present invention. The same constituent elements having identical functions as those of FIG. 1 are assigned with the same reference numerals for easy understanding of the embodiment.

The one-chip microcomputer of this embodiment includes a sub-program counter 24 in addition to the components of the conventional microcomputer of FIG. 31. Moreover, the change address RAM 31 is not limitatively constituted with a non-volatile memory. Namely, any rewritable memory is applicable thereto. In the microcomputer, an output 52 from a program counter 2 disposed in the microcomputer is fed to a program memory (ROM) 4 fabricated by use of a mask and the sub-program counter 24 which controls an address of a non-volatile memory 22. In this structure, either one of an output 54 from the program memory 4 and an output 62 from the non-volatile memory 22 is selected by a selector 12 to be supplied as an output 64 therefrom to an instruction decoder 10 of the one-chip microcomputer.

Supplied to the sub-program counter 24 are a sub-program counter control code 70 sent from the non-volatile memory 22 and an interruption signal 74 from the microcomputer. On the other hand, the sub-program counter 24 supplies the selector 12 and the non-volatile memory 22 with a selection signal 76 for a selection control of the selector 12 and a count output 78, respectively.

In the non-volatile memory 22, there are in advance written change address data of a program for insertion or replacement, change instruction codes related to the insertion for replacement at the address, and a control code for controlling the sub-program counter 24.

When the contents of the program counter 2 are ordinarily increased, an address coincidence signal 72 from the non-volatile memory 22 is non-active. In consequence, the selection signal 76 fed from the subprogram counter 24 for the selection control of the selector 12 is also non-active, and the contents of the output 64 from the selector 12 are identical to the value recorded in the program memory 4 at an address indicated by the contents of the program counter 2.

On the other hand, when the address value of the output 52 from the program counter 2 is equal to that of the change address data beforehand written in the non-volatile memory 22, the address coincidence signal 72 is set to an active state, and the output as a sub-program counter control code associated with the address is simultaneously delivered to the sub-program counter 24. When it is recognized according to the control code that the sub-program counter 24 is in an insertion mode (or in a replacement mode), the selection signal 76 for the selection control of the selector 12 is set to be active, and hence the value of the output from the selector 12 is employed as change instruction codes 62 written in the non-volatile memory 22. Until the sub-program control code 70 is changed to an insertion end code after this point, the change program data is successively outputted from the non-volatile memory 22 according to the output 78 from the subprogram counter 24, and the value of the change instruction codes 62 from the memory 22 is outputted from the selector 12. When the control code 70 is altered to the insertion end code, the selection signal 76 is set to a non-active state, and hence the output from the program memory 4 is selected by the selector 12, thereby outputting the output 64 to an instruction decoder 8.

However, when an interruption occurs from the one-chip microcomputer system during the consecutive read operation of the change instruction codes from the non-volatile memory 22, the interruption signal 74 is set to be active, and the output 62 associated with the read address data of the memory 22 is stacked. Moreover, the selection signal 76 for the selection control of the selector 12 becomes non-active, and the value of the program memory 4 is delivered as the output from the selector 12, thereby executing the program of the interruption routine. When the routine is completely executed, the contents of the sub-program counter 24 are restored to the change address which was accessed in the non-volatile memory 22 immediately before the interruption. The selection signal 76 becomes active, and the change instruction codes are read from the non-volatile memory 22 to be delivered as the output 64 from the selector 12.

Moreover, even when a multiple interruption state occurs during an execution of program data for insertion or replacement in the non-volatile memory 22, the configuration of the present embodiment can cope with the condition by use of the stack in the subprogram counter 24.

Figure 12:
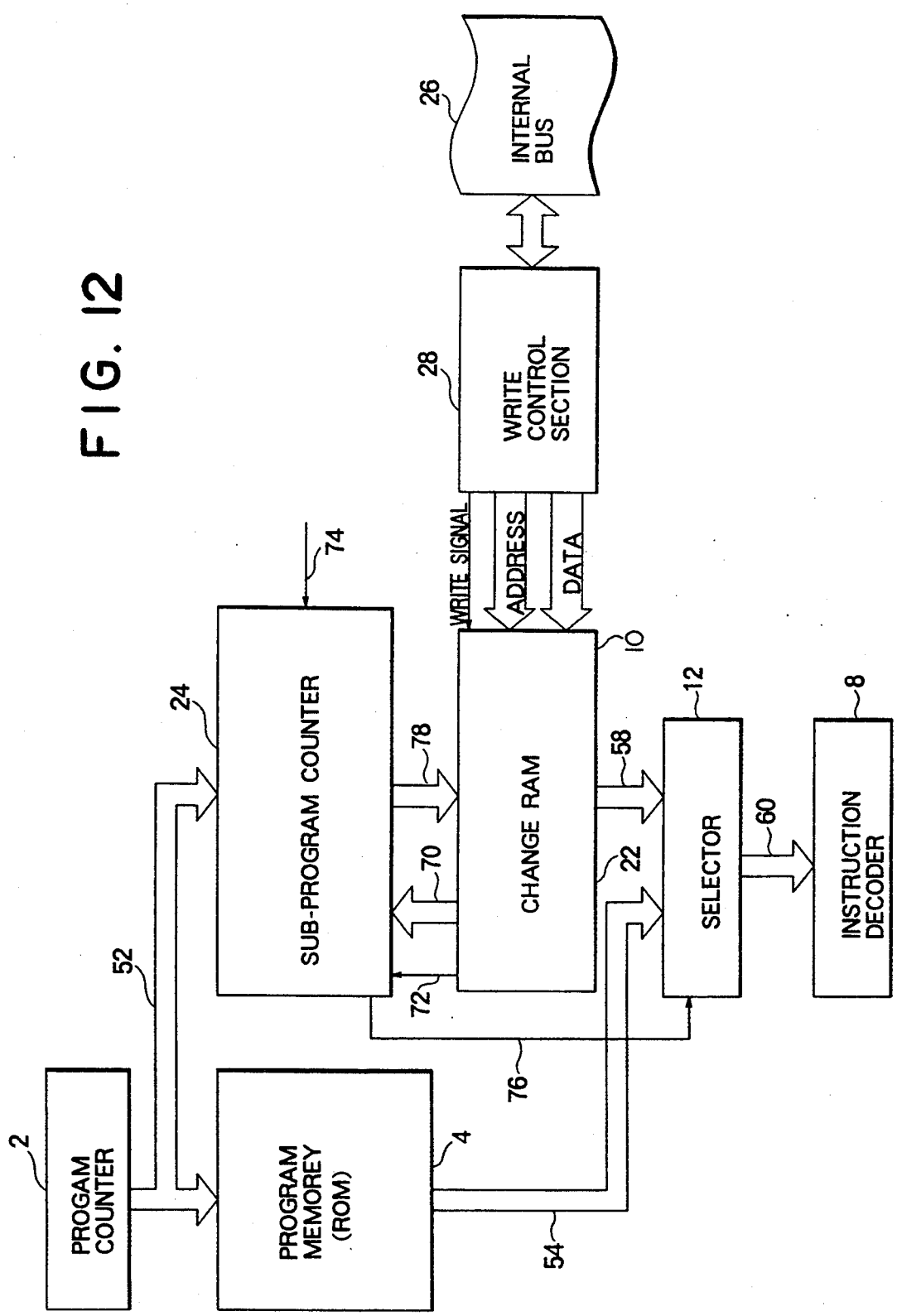
FIG. 12 is a block diagram showing the constitution of an alternative embodiment of a one-chip microcomputer according to the second aspect of the present invention.

FIG. 12 shows the constitution of an alternative embodiment according to the second aspect of the present invention. In this structure, an internal bus 26 is connected via a write control section 28 to the non-volatile memory 22 so that the change address data, change instruction codes, and control codes are written therein.

Figure 13:
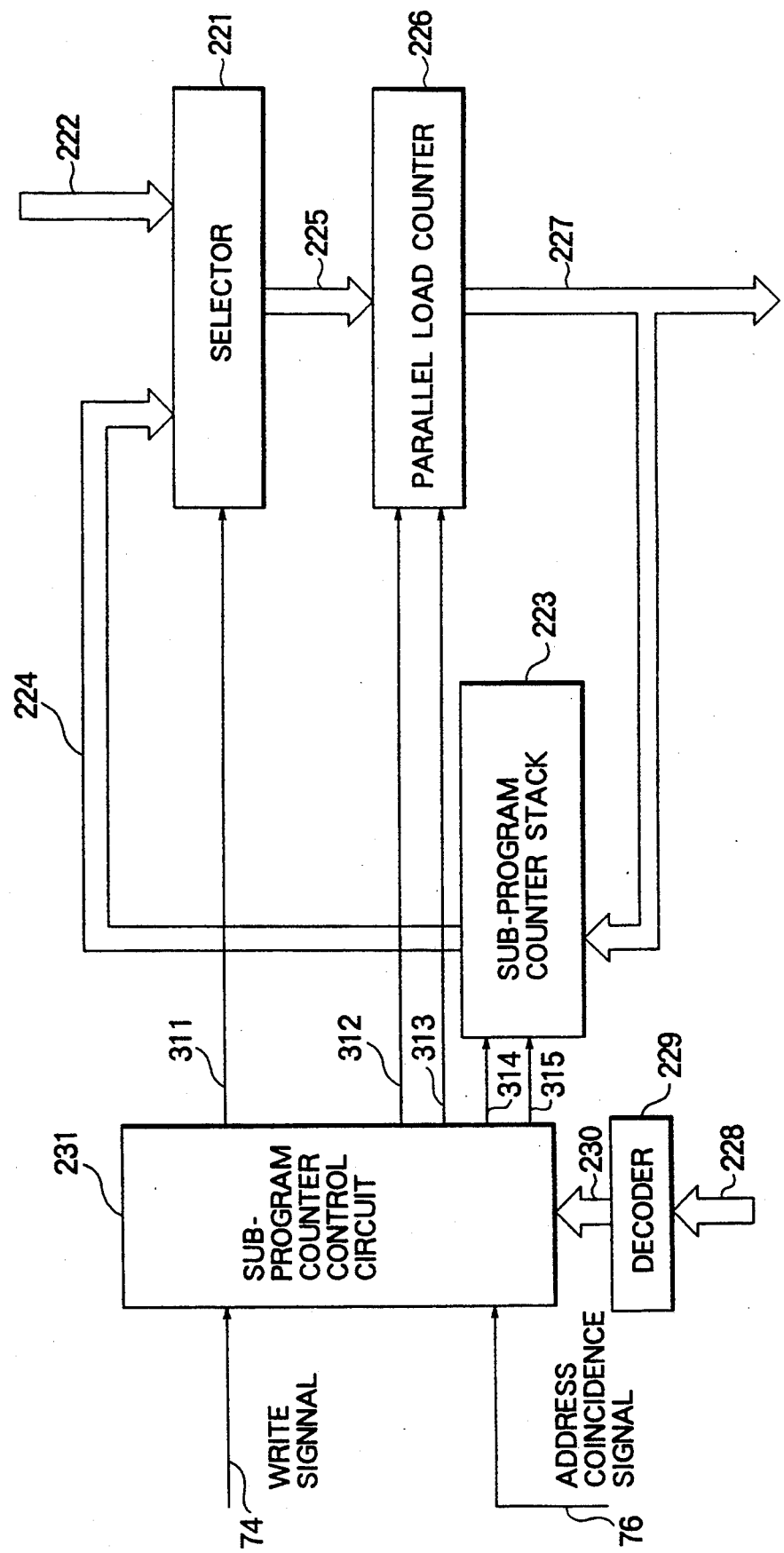
FIG. 13 is a block diagram showing an example of the configuration of a sub-program counter in each of the embodiments respectively shown in FIGS. 11 and 12.

FIG. 13 shows in a block diagram an example of the configuration of the sub-program counter 24 in the embodiments of FIGS. 11 and 12.

The sub-program counter 24 includes a selector 221, a parallel load counter 226, a sub-program counter stack 223, a sub-program counter control circuit 231, and a decoder 229.

The selector 221 selects either one of a program counter input 272 of the one-chip microcomputer system and an output 224 from the sub-program counter stack 223 to supply the selected data to a parallel-load input of the parallel load counter 226 achieving a parallel load and a count operation. A count output 227 from the parallel load counter 226 is fed to the nonvolatile memory 22 of the embodiment shown in FIG. 11 and to an input of the sub-program counter stack 223. Moreover, the control code signal from the memory 22 is delivered via a connection line 228 to the decoder 229. A decode output 230 from the decoder 229, the interruption signal 74 from the microcomputer system, and the address coincidence signal 72 therefrom are inputted to the sub-program counter control circuit 231 such that the selector 221, the parallel load counter 226, and the sub-program counter stack 223 are controlled by control signals 311 to 315.

The control signal 311 is a selection control signal for the selector 221, the control signals 312 and 313 for the parallel load counter 226 are a parallel load signal and a signal for controlling the clock signal of the count operation, and the control signals 314 and 315 are signals for controlling the pop and push operation of the sub-program counter stack 223.

In the initial state, the address coincidence signal 72 is in a non-active state. In this situation, according to a control operation of the sub-program counter control circuit 231, the contents of the program counter input 222 are fed via the selector 221 and the parallel load counter 226 to the address output terminal 227 of the sub-program counter 24.

Moreover, when the address coincidence signal 72 becomes active, based on the control code 70 simultaneously inputted to the sub-program counter 24, the parallel load counter 226 starts the counting operation and the value is simultaneously pushed into the sub-program counter stack 223, thereby sequentially incrementing the address value. When an insertion mode end code appears in the decoder 229, the sub-program counter stack 223 is popped by the sub-program counter control circuit 231, and hence the address coincidence signal 72 is set to be non-active. Resultantly, the contents of the program counter input 222 are delivered via the selector 221 and the parallel load counter 226 to the address output terminal 227 of the sub-program counter 24. However, in a case where an interruption takes place from the one-chip microcomputer system during an execution in the insertion mode, the value of the parallel load counter 226 is pushed again into the sub-program counter stack 223 such that until the interruption terminates execution thereof, the contents of the program counter input 222 are fed via the selector 221 and the parallel load counter 226 to the address output terminal 227 of the sub-program counter 24. As a result, the one-chip microcomputer system operates according to the contents of the program memory. When the interruption routine terminates operation thereof, the sub-program counter stack 223 is popped by the subprogram counter control circuit 231, and hence the value immediately before the execution of the interruption routine is outputted via the selector 221 and the parallel load counter 226 to the address output terminal 227 of the sub-program counter 24.

Figure 14:
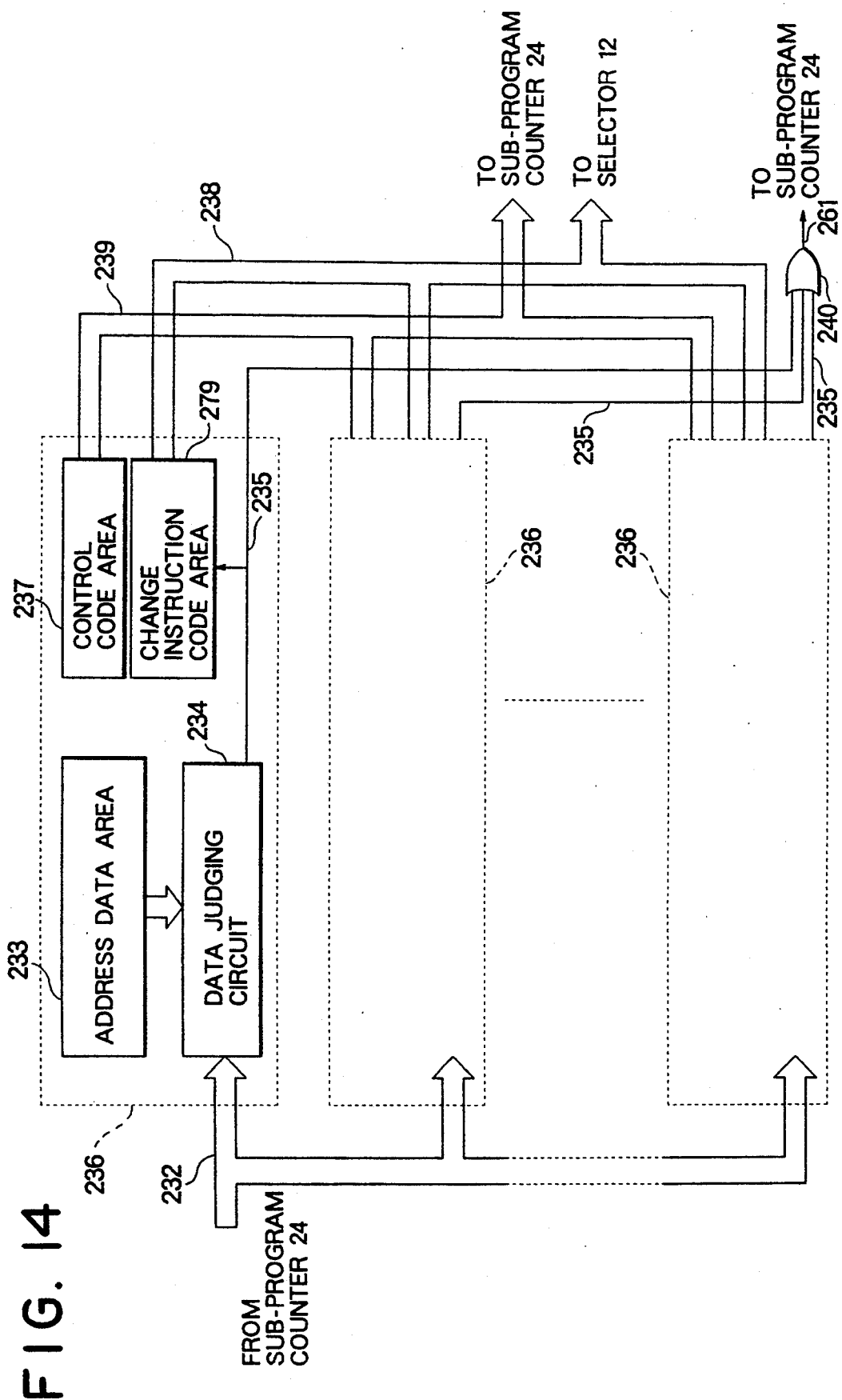
FIG. 14 is a block diagram showing an example of the configuration of the change RAM.

FIG. 14 shows in a block diagram an example of the non-volatile memory 22 in the embodiment of FIG. 11. Referring to this diagram, description will be given of the construction and the operation of the memory.

An address from the sub-program counter 24 is fed to an address input terminal 232 to obtain a value. The value is compared by a data judge circuit 234 with a value of change address data beforehand written in an address data area 233. If this results in coincidence, an coincidence signal line 235 is set to be active by the data judge circuit 234. In response to the active signal, data accumulated in a program data area 279 and a control code area 237 are delivered to a program data output signal line 238 and a control code output signal line 239, respectively. Accordingly, depending on the value of the address arbitrarily inputted to the address input terminal 232, there are obtained change address codes and control codes associated with the change address data. Moreover, presence or absence of a coincident address is inputted to an OR circuit 240 via the coincidence signal line 235 of each of the plural areas 279 for change instruction codes. An output 241 therefrom is delivered to the sub-program counter 24 (FIG. 11). As a result, presence or absence of necessity for a program replacement or insertion can be notified to the sub-program counter 24.

Figure 15:
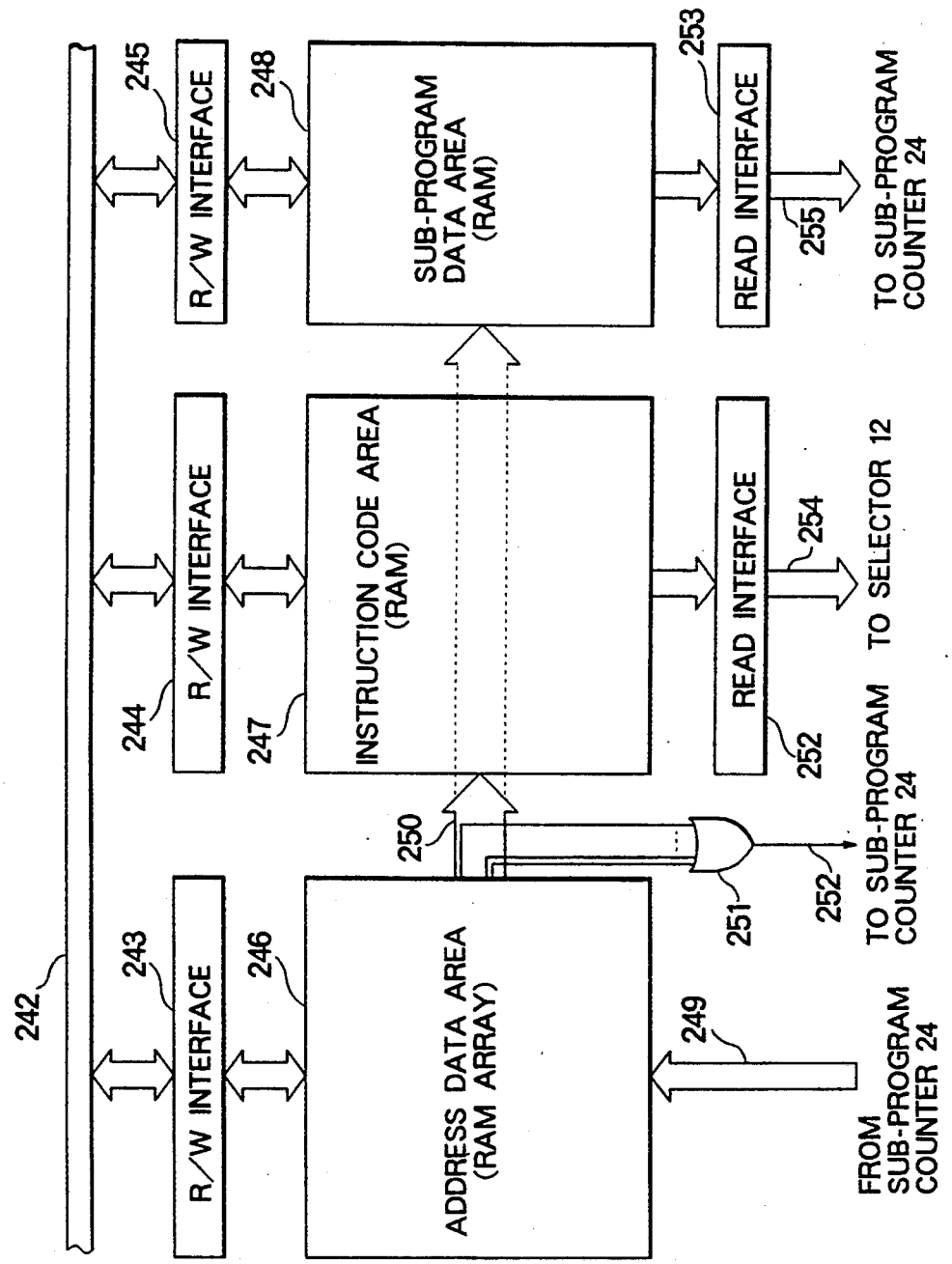
FIG. 15 is a block diagram showing another example of the configuration of the change RAM.
Figure 17:
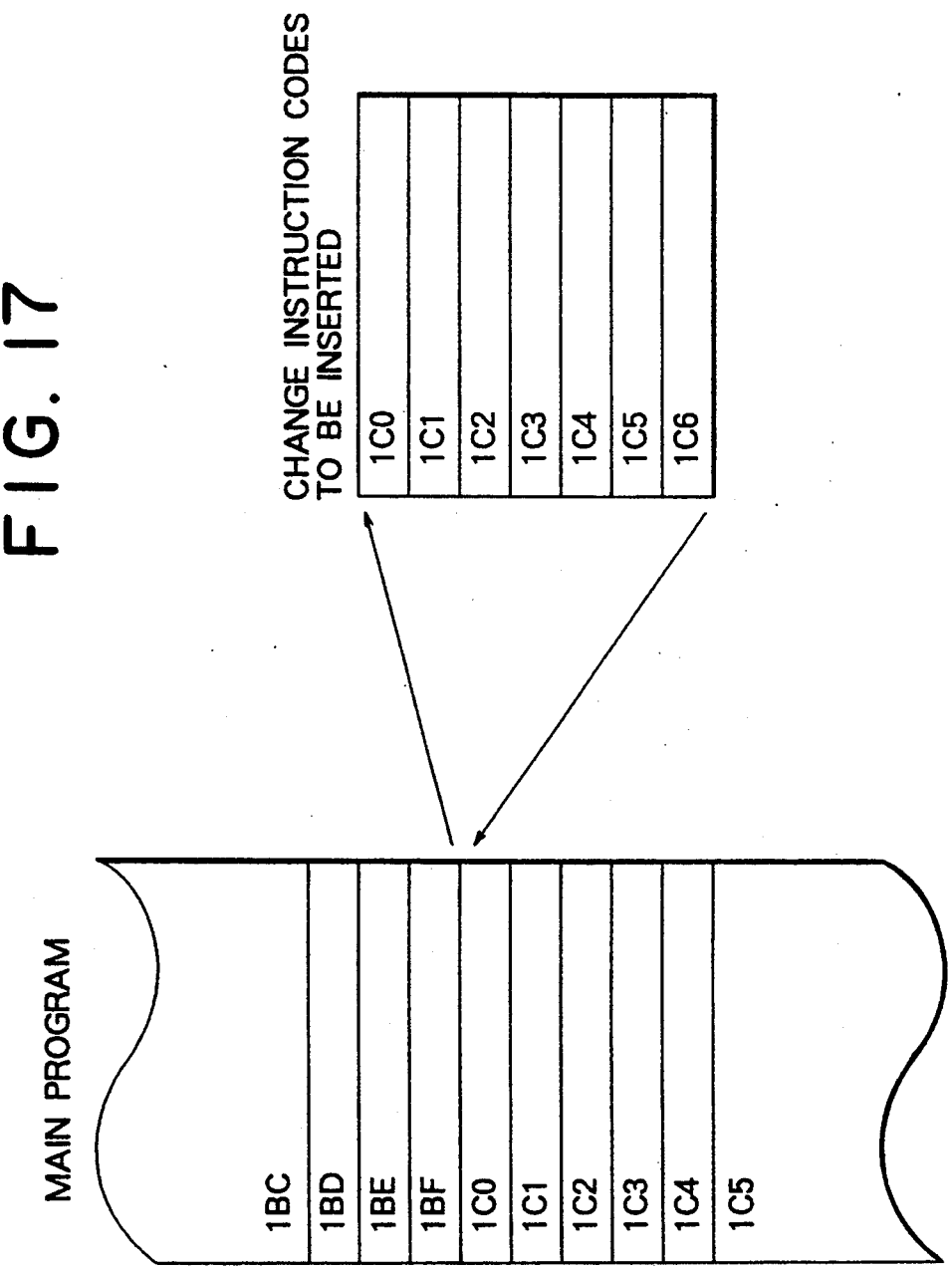
FIG. 17 is a flowchart showing an example of insertion of simple data.
Figure 18:
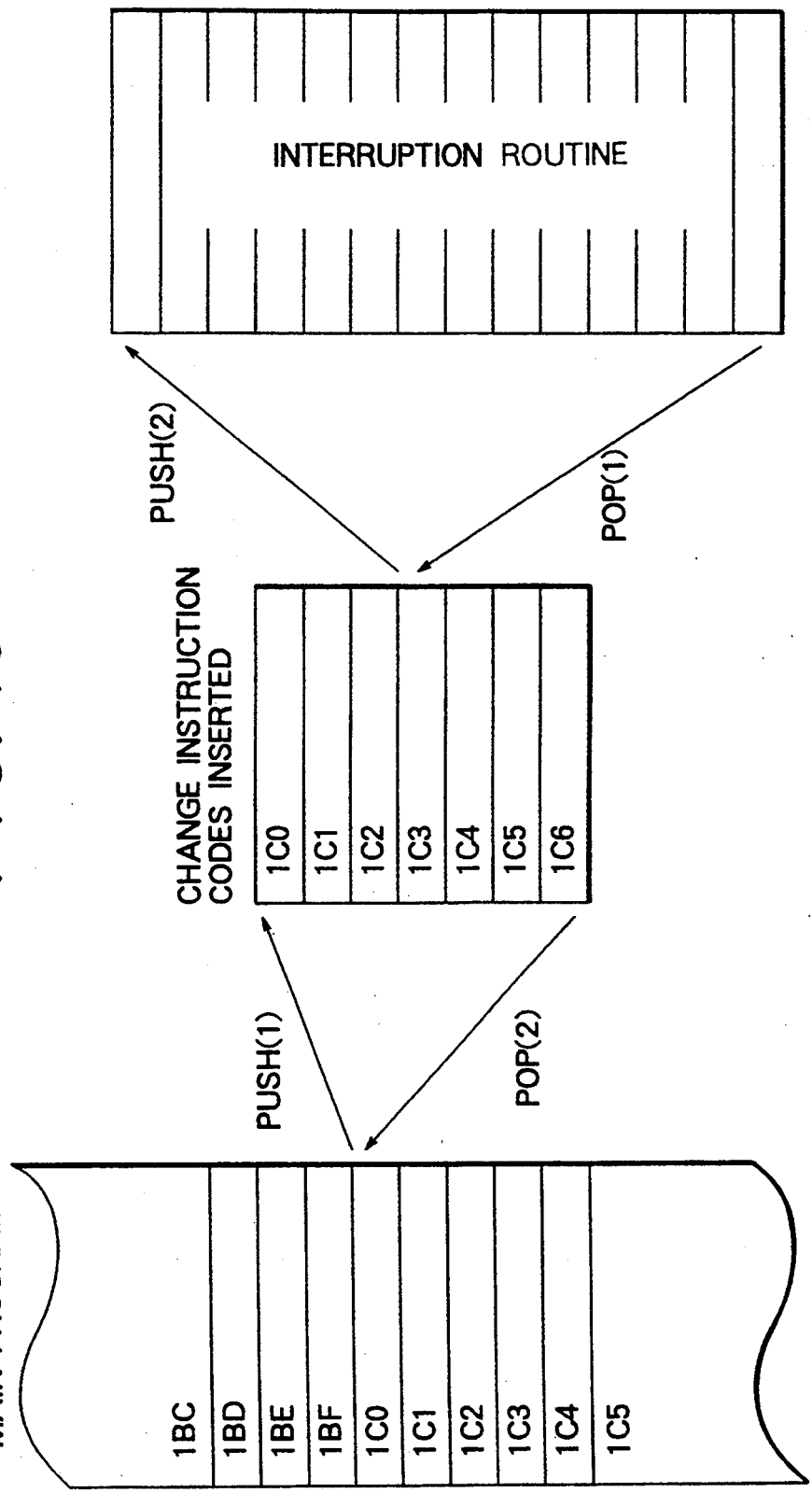
FIG. 18 is a flowchart showing an operation in which an interruption occurs during an execution of the insertion instruction codes of FIG. 17.

FIG. 15 is a block diagram showing another example of the non-volatile memory 22 in the embodiment of FIG. 11. In this constitution example, the areas for keeping therein the change address data, change instruction codes, and sub-instruction data are implemented by a memory array. This minimizes the area of the chip when the construction is formed in a semiconductor integrated circuit.

In this structure, an address data area 246 implemented by an RAM array, a program data area 247 of an RAM, and a sub-instruction data area 248 of an RAM can be accessed via an internal bus 242 and three read/write (R/W) interface circuits 243 to 245, respectively. Furthermore, the address data area 246 is used to set a selection signal 250 between the program data area 246 and the sub-instruction data area 248 depending on a value supplied to an address input terminal 249 from the sub-program counter 24. In addition, a plurality of selection signals 250 are fed to an OR circuit 251, thereby obtaining an ORed result. The output 252 can be used as an address coincidence signal.

The signals respectively fed to the selector 12 and the subprogram counter 24 of FIG. 11 are thereafter read via interface circuits 252 and 253 to be delivered as outputs 254 and 255, respectively.

FIG. 16 shows an example of data written in the non-volatile memory 22. In this example, there are used three-bit codes for sub-instruction data.

Figure 19:
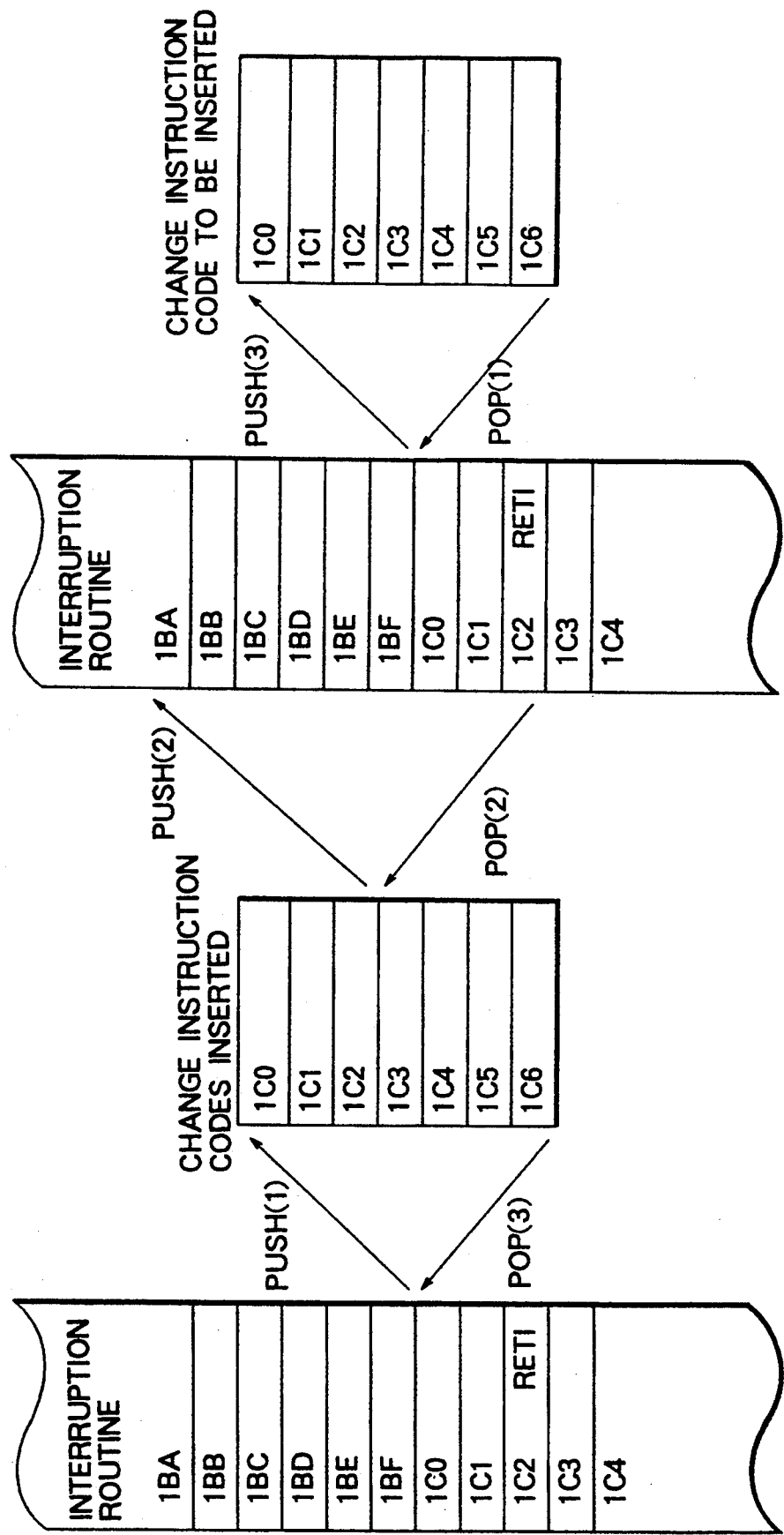
FIG. 19 is a flowchart showing a case where insertion instruction codes are executed in the program of the interruption routine and then the identical interruption routine is again executed during the execution of the insertion instruction codes.
Figure 20:
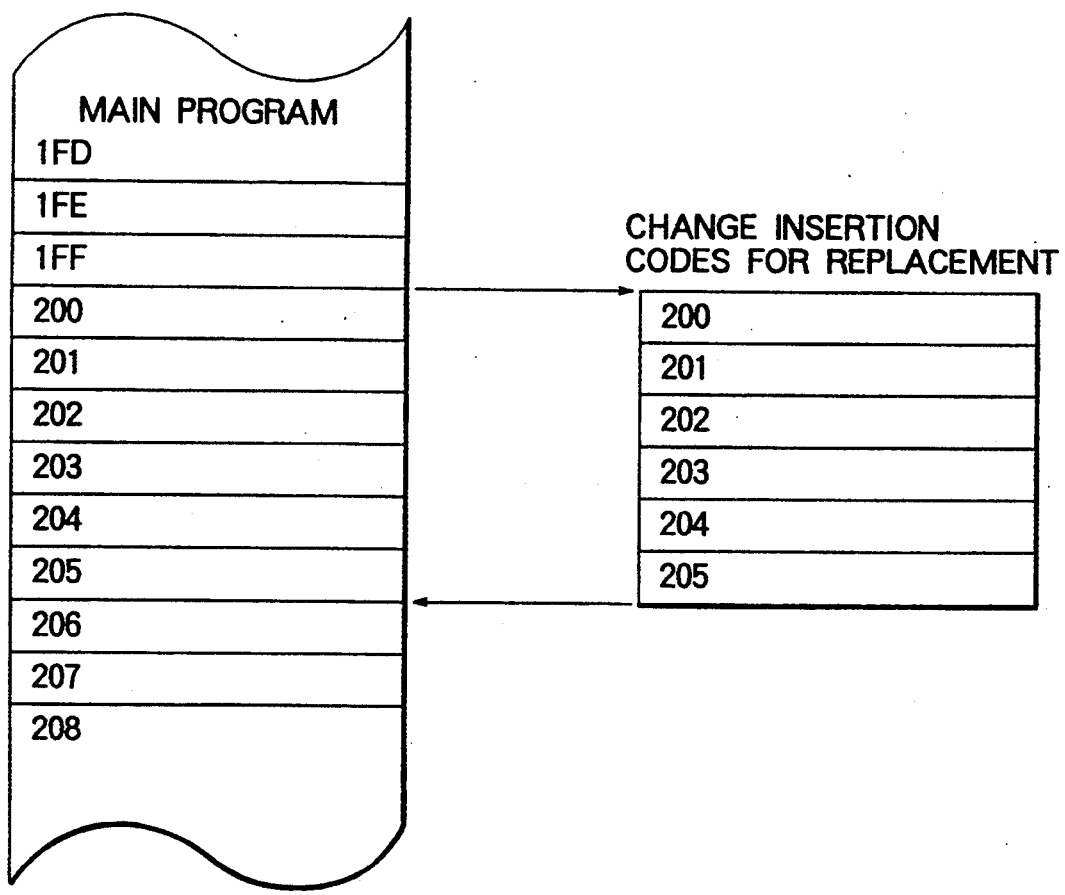
FIG. 20 is a flowchart showing an example of operation in which data undergoes a simple replacement.

000: Simple replacement
001: During insertion
010: Insertion inhibition
100: Insertion start
101: Insertion end FIGS. 17 to 20 show an example of operation to process data of FIG. 16. Specifically, FIGS. 17 and 18 respectively show a procedure of a simple insertion and a case where an interruption occurs during execution of the insertion program in the situation of FIG. 17. FIG. 19 shows an example in which after an insertion program is executed in a program of an interruption routine and then the identical interruption routine is executed again during execution of the insertion program. FIG. 20 shows an example of a simple replacement.

Figure 21:
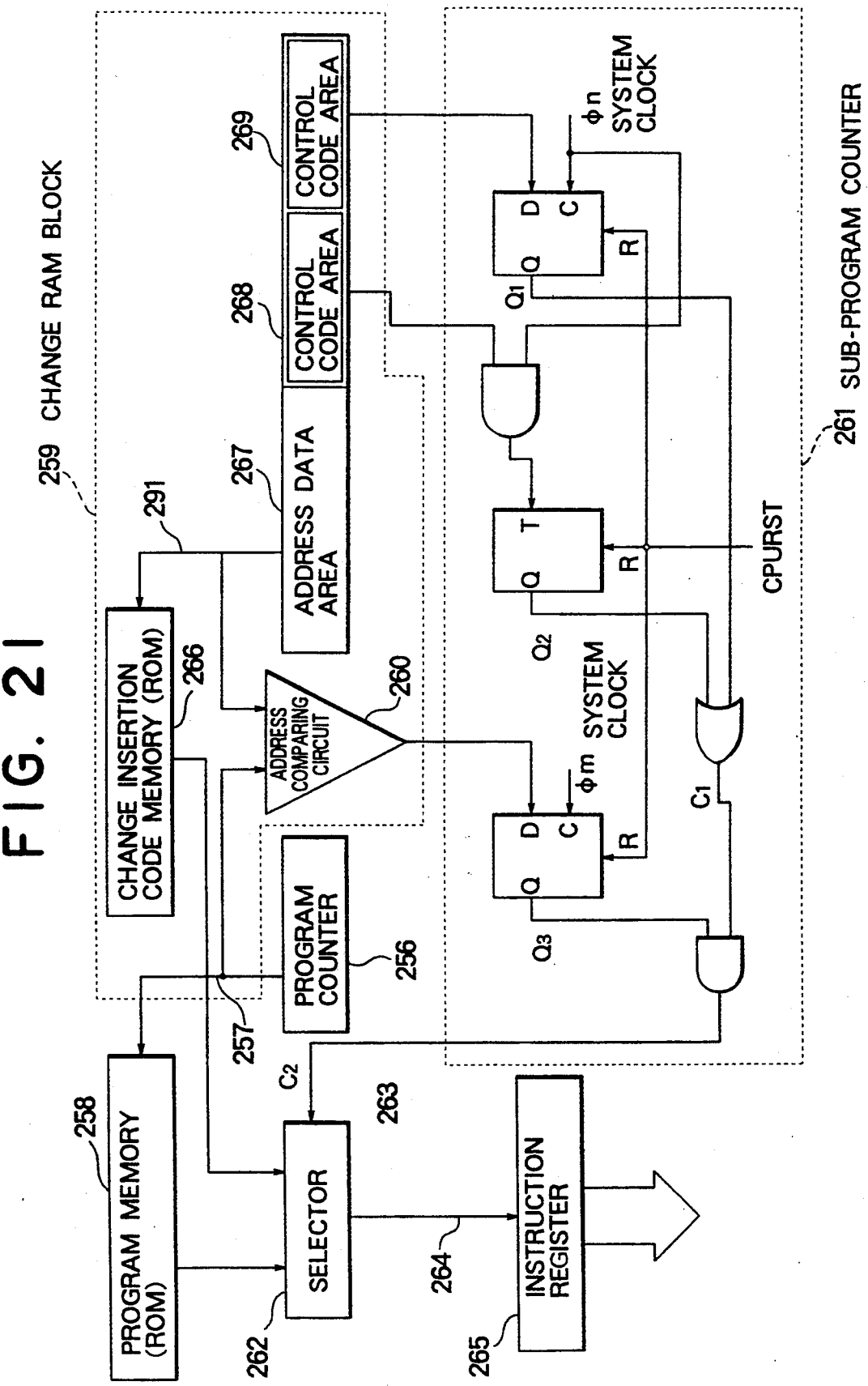
FIG. 21 is a block diagram showing the configuration of a still alternative embodiment of the one-chip microcomputer according to the second aspect of the present invention.

FIG. 21 shows the configuration of an alternative embodiment of the one-chip microcomputer according to the present invention. In this structure, the constitution of the sub-program counter 24 of the embodiment of FIG. 11 is remarkably simplified. Unlike the configuration of FIG. 11, thanks to simplification of the second program counter, the embodiment of FIG. 21 allows only a one-level nesting for interruption. Consequently, when the insertion mode is to be adopted in a program, it is required that a multi-interruption does not take place in the program.

The operation of the embodiment will next be described.

Figures 22, 23:
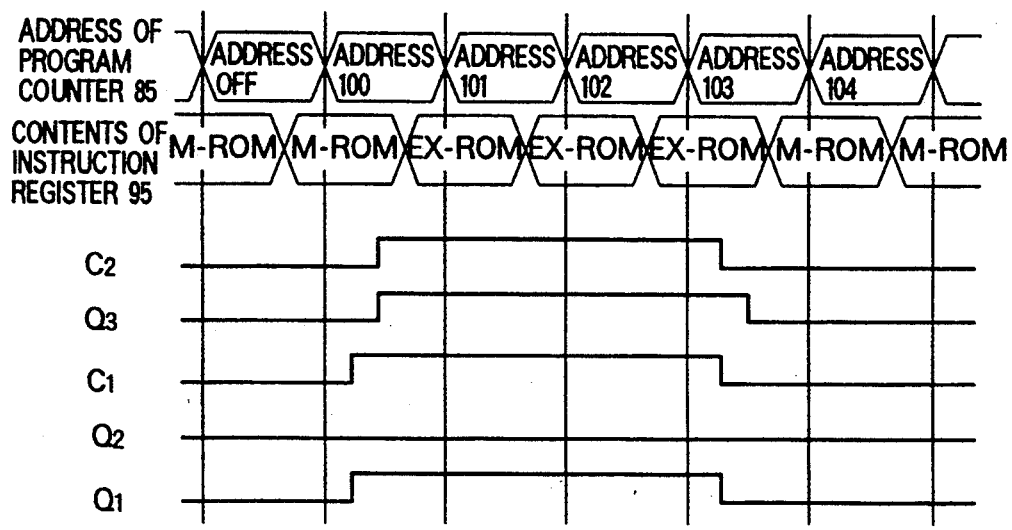
FIG. 22 is a diagram showing two-bit control codes in a control code area according to the embodiment of FIG. 21.
FIG. 23 is a signal timing chart related to the simple data replacement in the embodiment of FIG. 21.

When an address output 257 from a program counter 256 is supplied to an address input terminal of a program memory 258 and an input terminal of an address comparing circuit 260 of an RAM block for change 259, a signal 263 for selection of a selector 262 is delivered from a sub-program counter 261 thus implemented as a simplified second program counter. Moreover, an output signal 264 from the selector 262 is delivered to an instruction register 265 to be supplied to the instruction decoder of the one-chip microcomputer system. The basic operation of this embodiment is substantially identical to that of the embodiment of FIG. 11. Desired data items are beforehand written in an instruction code memory 266, an address data area 267 and two-bit control code areas 268 and 269 in the block 259. During execution of a program, the value of the address data area 267 is compared with that of the program counter 256 by the address comparator 260 so as to deliver a result of the comparison to the sub-program counter 261, thereby controlling the selection signal 263 according to the contents of two-bit control code areas 268 and 269. FIG. 22 shows correspondences between codes of the two-bit control code areas 268 and 269.

Figure 24:
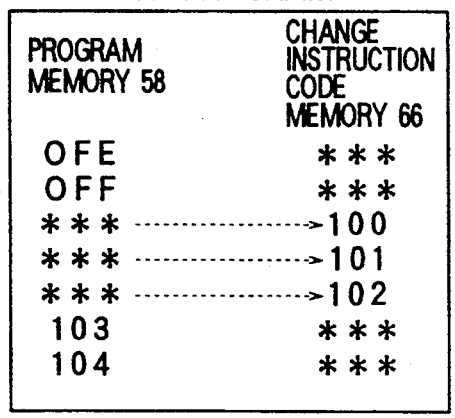
FIG. 24 is a diagram schematically showing a program flow in association with the signal timing chart of FIG. 23.
Figure 25:
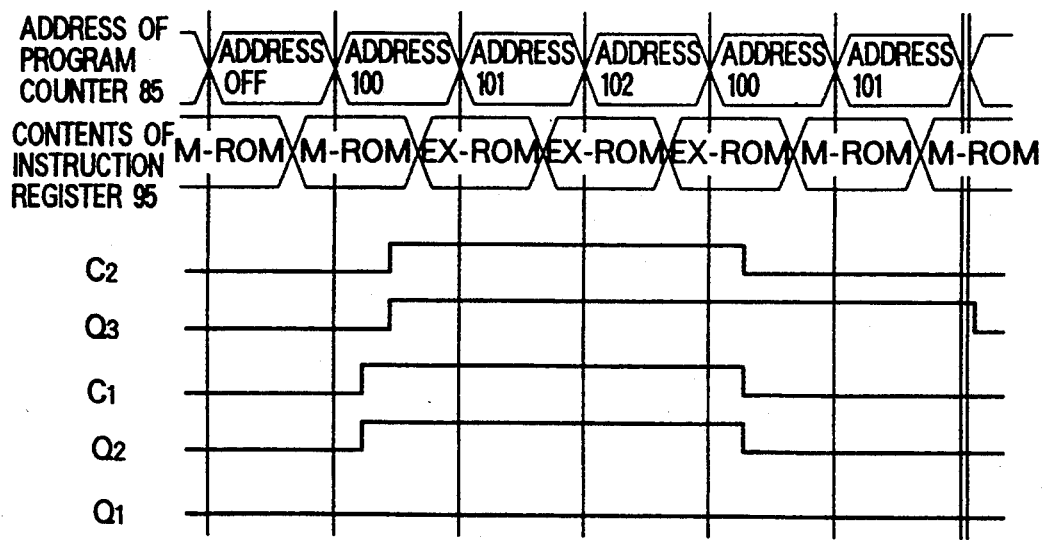
FIG. 25 is a signal timing chart of operation in an insertion mode according to the embodiment of FIG. 21.

Moreover, FIG. 23 is a signal timing chart for the simple replacement, FIG. 24 shows a flow of the program, FIG. 25 is a signal timing chart for the insertion mode, and FIG. 26 shows a flow of the program in the insertion mode.

In the one-chip microcomputer structured as above, like in the first embodiment, even when modifications exceeds the capacity of the program change RAM, the program modifications can be achieved without increasing the capacity thereof.

Moreover, in place of replacement of program data stored in the ROM with instruction codes stored in the RAM, insertion of change instruction codes can be easily achieved.

[Embodiment 3]

Figure 27:
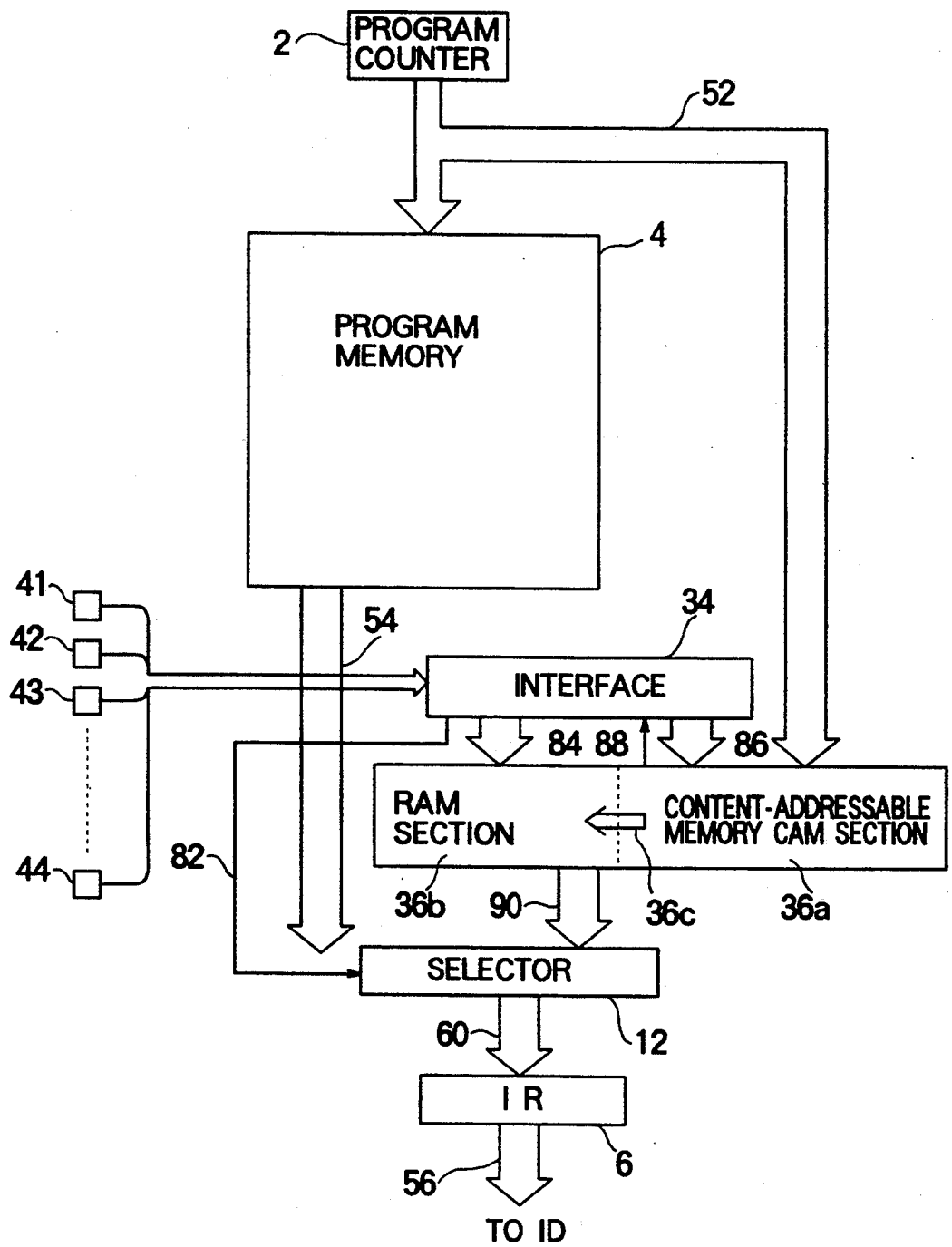
FIG. 27 is a block diagram showing an embodiment of the microcomputer in accordance with the third aspect of the present invention.

Referring now to FIG. 27, description will be given of the configuration and the operation of a one-chip microcomputer in accordance with the third aspect of the present invention. In this embodiment, the same components as those of FIG. 1 are assigned with the same reference numerals to facilitate understanding thereof.

The embodiment further includes an associative memory 36 constituted with a content-addressable memory (CAM) 36a and an RAM section 36b, an interface 34, and a plurality of terminals 41 to 44. A reference numeral 12 designates a selector.

In this structure, an output 52 from a program counter 2 is supplied to a program memory (ROM) 4 formed by using a mask and the CAM section 36a such that either one of an output 54 from the program memory 4 and an output 90 from the RAM section 36b is selected by the selector 12, thereby transmitting the selected output 60 to an instruction register 6. The output 60 is temporarily kept in the register 6. Thereafter, an output 56 from the register 6 is inputted to an instruction decoder, not shown, of the one-chip microcomputer. The terminals 41 to 44 are connected to the interface 34 having a shift register, not shown. In this construction, outputs 84 and 86 from the interface 34 are delivered to the RAM section 36b and the CAM section 36a of the associative memory 36.

The output 52 from the program counter 2 is supplied as an associative input to the CAM section 36a of the memory 36, whereas the output 86 from the interface 34 is fed as an association objective input to the memory 36. Delivered from the CAM section 36a to the interface 34A is a coincidence signal 88 to notify coincidence of an address denoted by the output 52 from the program counter 2 with a change address indicated by the output 86 written in the interface 34. Moreover, an output 36c from the CAM section 36a is fed as a selection signal to the RAM section 36b such that a selection control signal 82 to select either one of program data of the output 54 from the program memory 4 and change data of the output 90 from the RAM section 36b is delivered from the interface 34 to the selector 12.

In the CAM section 36a and the RAM section 36b of the associative memory 36, there are in advance stored change address data of a program to be changed and data of change instruction codes of the program, respectively. Furthermore, the change address data and the instruction code data can be written in the interface 34 in the form of a series of data via the terminals 41 to 44.

The operation of the configuration above will next be described.

In an ordinary operation of the one-chip microcomputer, the incidence signal 88 from the CAM section 36 to the interface 34 is non-active and hence the selection control signal 82 delivered from the interface to control the selection control of the selector 12 is also set to be non-active. Namely, the contents of the output 60 from the selector 12 become to be substantially equal to the value of the program memory 4 indicated by the program counter 2. Consequently, in the usual operation, the constitution of this embodiment and the conventional computer shown in FIG. 30 achieve substantially the same operation.

Subsequently, description will be given of the operation in a case where a trouble such as a wrong operation occurs in an electronic apparatus or the like in which the one-chip microcomputer is incorporated.

To determine whether or not any wrong operation has occurred in the microcomputer, change address data and instruction code data to be replaced with the values stored in the program memory 4 are inputted as a sequence of data series from the plural terminals receiving signals such as a signal generated from a crystal oscillator and a reset signal, the signal not exerting any adverse influence upon the operation of the electronic apparatus. As a result, the change address data and the instruction code data are written respectively via the output 86 in the CAM section 36 of the associative memory 36 and via the output 84 in the RAM section 36 thereof.

On the other hand, the output 52 from the program counter 2 is delivered to the CAM section 36 such that the value of the change address data written according to the output 86 is compared with that of the address designated by the output 52. When these values are equal to each other, the coincidence signal 88 becomes to be active and is inputted to the interface circuit 34. In association therewith, an active selection control signal 82 is fed from the interface 34 to the selector 12. A selection signal related to the coincident address is supplied as an output 36c to the RAM section 36 such that instruction code data corresponding to the selection signal is delivered via the output 90 to the selector 12. Since the selection control signal 182 for the selector 12 is active, the value of the output 60 from the selector 12 is identical to the instruction code data outputted from the RAM section 36b of the associative memory 36. The value of the output 60 is temporarily kept in the instruction register 6. The value is thereafter fed as an output 56 to the instruction decoder of the microcomputer.

According to the present instruction as above, even in the final product of a microcomputer including a program memory developed therein through a mask, the contents of the program can be altered in accordance with an input supplied thereto from an external device.

In this connection, according to the embodiment above, in addition to the modification of the program, an insertion of a program can also be achieved by inputting, for example, an interruption signal to the associative memory 36.

Furthermore, in this embodiment, the selection control signal 82 is supplied from the interface unit 34 to the selector 12 to control the output to the instruction decoder of the microcomputer. However, it is only necessary to deliver the output from the associative memory to the instruction decoder of the microcomputer when the address of the output from the program counter matches the change address data contained in the sequence of data written from an external device.

Figure 28:
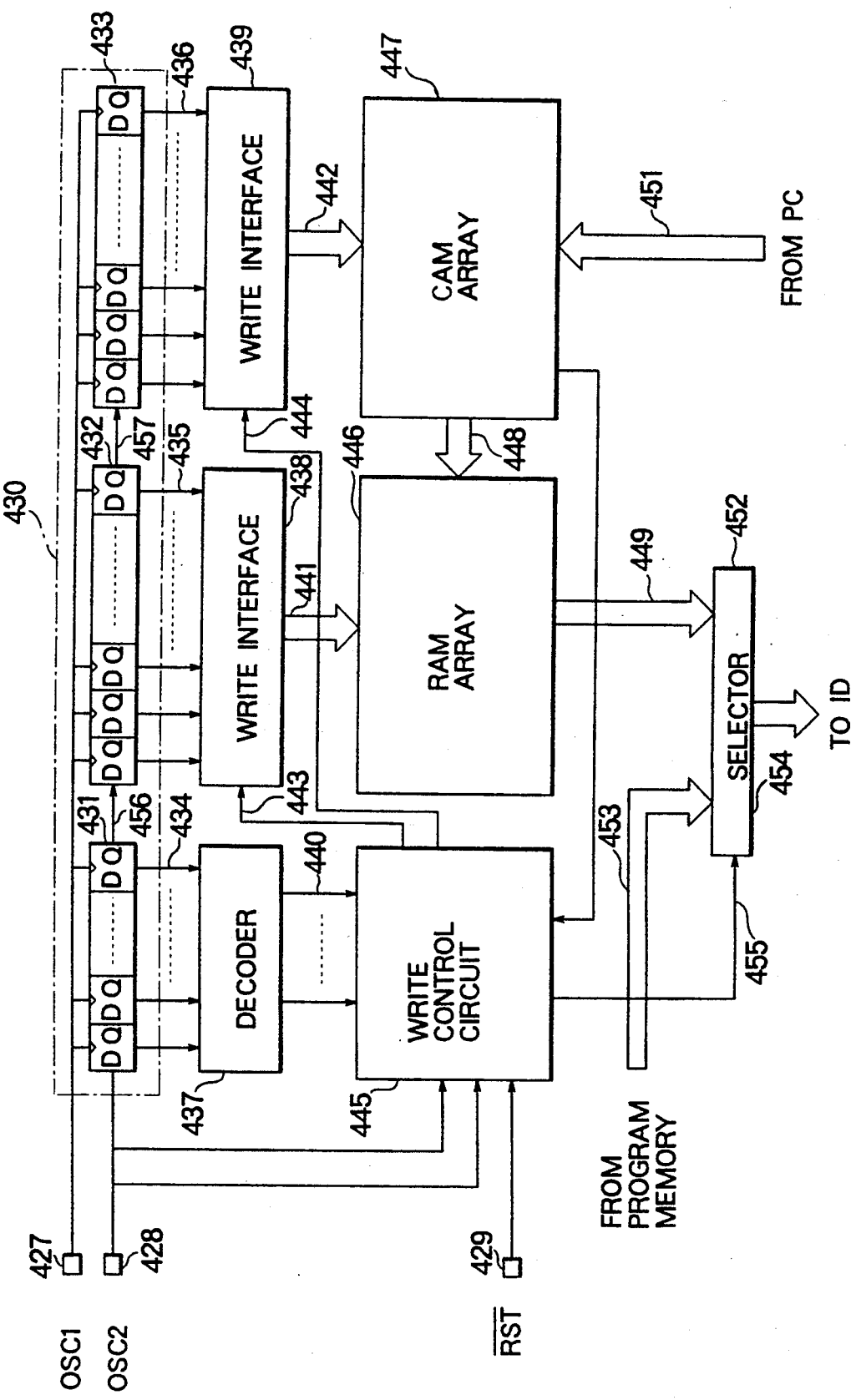
FIG. 28 is a diagram showing an example of the constitution of an interface circuit of the microcomputer shown in FIG. 27.

Referring now to FIG. 28, description will be given of the operation and the configuration of the interface circuit of the microcomputer in an embodiment according to the present invention.

As shown in the constitution diagram of FIG. 28, an output 451 from the program counter, not shown, is fed as an associative input to a CAM array 447 such that an output 448 from the array 447 is inputted as a selection signal to an RAM array 446. An address and an instruction code selected by the output 448 are supplied as an output 449 to a selector 452. Furthermore, an output 453 from the program memory, not shown, is also fed to the selector 452 such that either one of the outputs 453 and 449 is selected by the selector 452 to be delivered as an output 454 to the instruction decoder, not shown, of the one-chip microcomputer.

A shift register section 430 is in general constituted with a shift register 431 for keeping therein a control code, a shift register 432 for keeping therein data of an instruction code, and a shift register 433 for keeping therein change address data. To input a clock signal to the shift register section 430 and a write control circuit 445, a terminal OSC1 427 is connected to the shift registers 431 to 433 and the write control circuit 445. Moreover, a terminal OSC2 428 is linked with the shift register 431 and the circuit 445 to supply input data thereto. An output 456 from the shift register 432 is supplied as input data to the shift register 432. An output 457 from the shift register 432 is fed as a data input to the shift register 433. A control code 434, instruction code data 435, and change address data 436 are transferred respectively from the shift registers 431 to 433 in the form of a sequence of data items to a decoder 437 and write interface circuits 438 and 439, respectively. The transferred items are temporarily kept therein. Thereafter, outputs 440, 441, and 442 respectively from the decoder 437, the write interface 438, and the write interface 439 are written in the write control circuit 445, the RAM array 446, and the CAM array 447. Outputs 443 and 444 from the write control circuit 445 control the interface circuits 438 and 439, respectively. In addition, the circuit 445 is also connected to a reset terminal 429.

When the address denoted by the output 451 supplied from the program counter to the CAM array 447 is equal to the change address written in the CAM array 447 according to the output 442, a coincidence signal 450 is fed to the write control circuit 445. In association therewith, a selection signal 455 is delivered from the circuit 445 to the selector 452, thereby controlling the output 454 from the selector 452.

The operation of the constitution above will now be described.

In an ordinary state of the one-chip microcomputer, the coincidence signal 450 from the CAM array 447 to the write control circuit 445 is in a non-active state, and hence the selection control signal 455 produced from the write control circuit 445 to control the selector 452 is associatively set to be non-active. Consequently, the contents of the output 454 from the selector 452 are equivalent to the value denoted by the output 453 from the program memory. In the ordinary operation, consequently, the construction above functionally achieves substantially the same operation as the conventional microcomputer of FIG. 30.

Subsequently, description will be given of the operation in a situation where a trouble such as an erroneous operation takes place in an electronic apparatus or the like containing the one-chip microcomputer therein.

In order to determine whether or not a wrong operation has occurred in the microcomputer, clock signals are supplied to the shift registers 431 to 433 via the OSC1 terminal 427 not exerting any wrong influence upon the operation of the apparatus. Data at an address where the output from the program memory, not shown, is to be replaced with the original data is inputted from the OSC2 terminal 428 to the write control circuit 445 and the shift register 431. In response to the outputs 456 and 457; the control code 434, the instruction code data 435, and the change address data 436 are respectively fed from the shift registers 431, 432, and 433 as a sequence of data series to the decoder 437, the write interface 438, and the write interface 439, respectively. The output 440 from the decoder 437 is inputted to the control circuit 445, and then the output 441 from the write interface 438 is written as instruction code data in the RAM array 446. Moreover, the output 442 from the interface 439 is written as address data in the CAM array 447.

On the other hand, the output 451 from the program counter is also delivered to the CAM array 447 such that the value of the change address data stored therein in response to the output 442 is compared with that of the address designated by the output 451 from the program counter. If coincidence results, the coincidence signal 450 is set to be active and a selection signal associated with the coincident address is fed as the output 448 to the RAM array 446 so as to supply the selector 452 with the output 449 containing instruction code data related to the selection signal. In association with the coincident signal 450, the selection control signal 455 also becomes to be active, and hence the value of the output 454 from the selector 452 is identical to the output 449 from the RAM array 446.

Incidentally, in the microcomputer of this embodiment, although there are arranged the OSC1 terminal 427, the OSC2 terminal 428, and the reset terminal 429 to supply inputs from an external device to the system, the present invention is not restricted by this example of input terminals.

Moreover, the shift register section 430 is constituted with three shift registers in the embodiment; however, the present invention is not limited to this embodiment.

Subsequently, the operation of the microcomputer of FIG. 28 will be described in accordance with the present invention by referring to the signal timing chart of FIG. 29.

Figure 29:
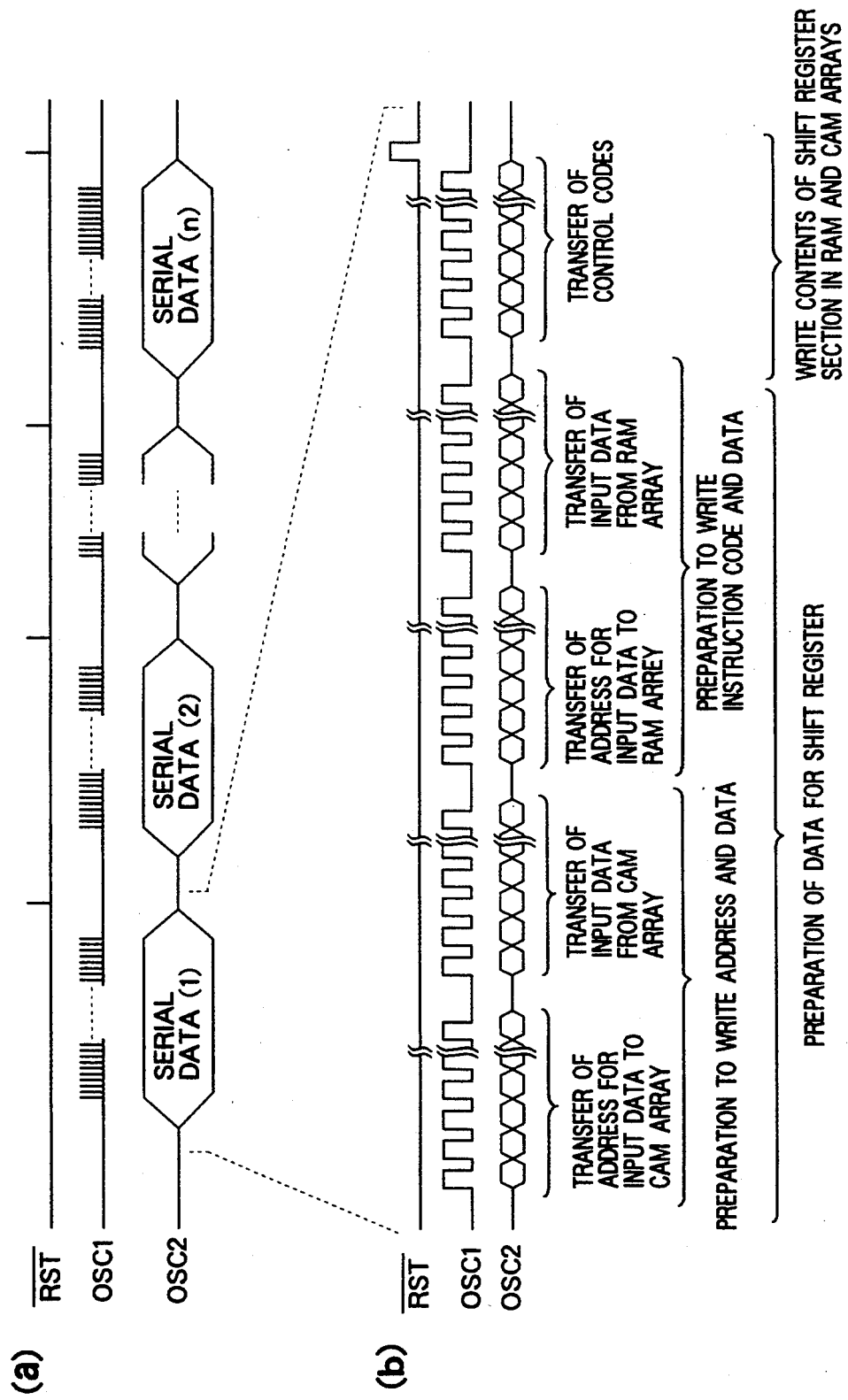
FIG. 29 is a signal timing chart of the microcomputer of FIG. 28.

As can be seen in an upper portion (a) of FIG. 29, a reset signal and a clock signal are inputted respectively from the reset terminal 429 and the OSC1 terminal to the system. From the OSC2 terminal 48, data associated with data of plural instruction codes to be delivered, in place of the output from the program memory, to the instruction decoder of the microcomputer is inputted to the apparatus in an order of serial data (1) and serial data (2).

Referring to a lower portion (b) of FIG. 29, description will be given of the input of serial data (1) from the OSC2 terminal 428. Pulse signal series are supplied in the units respectively related to a transfer of an address of input data in the CAM array, a transfer of input data to the CAM array, a transfer of an address of input data in the RAM array, and a transfer of input data to the RAM array. More concretely, when the address transfer and input data transfer to the CAM array are finished, the address data is ready to be written in the CAM array. Furthermore, when the address transfer and input data transfer to the RAM array are completed, the instruction code data is ready to be written in the RAM array. When the data is prepared in the shift register section 430, a control code is transferred from the OSC2 terminal 428 so that the contents thereof are written in the RAM and CAM arrays.

The operation above is repeatedly accomplished for a required number of times to completely write data items in the CAM and RAM arrays, respectively.

Figure 30:
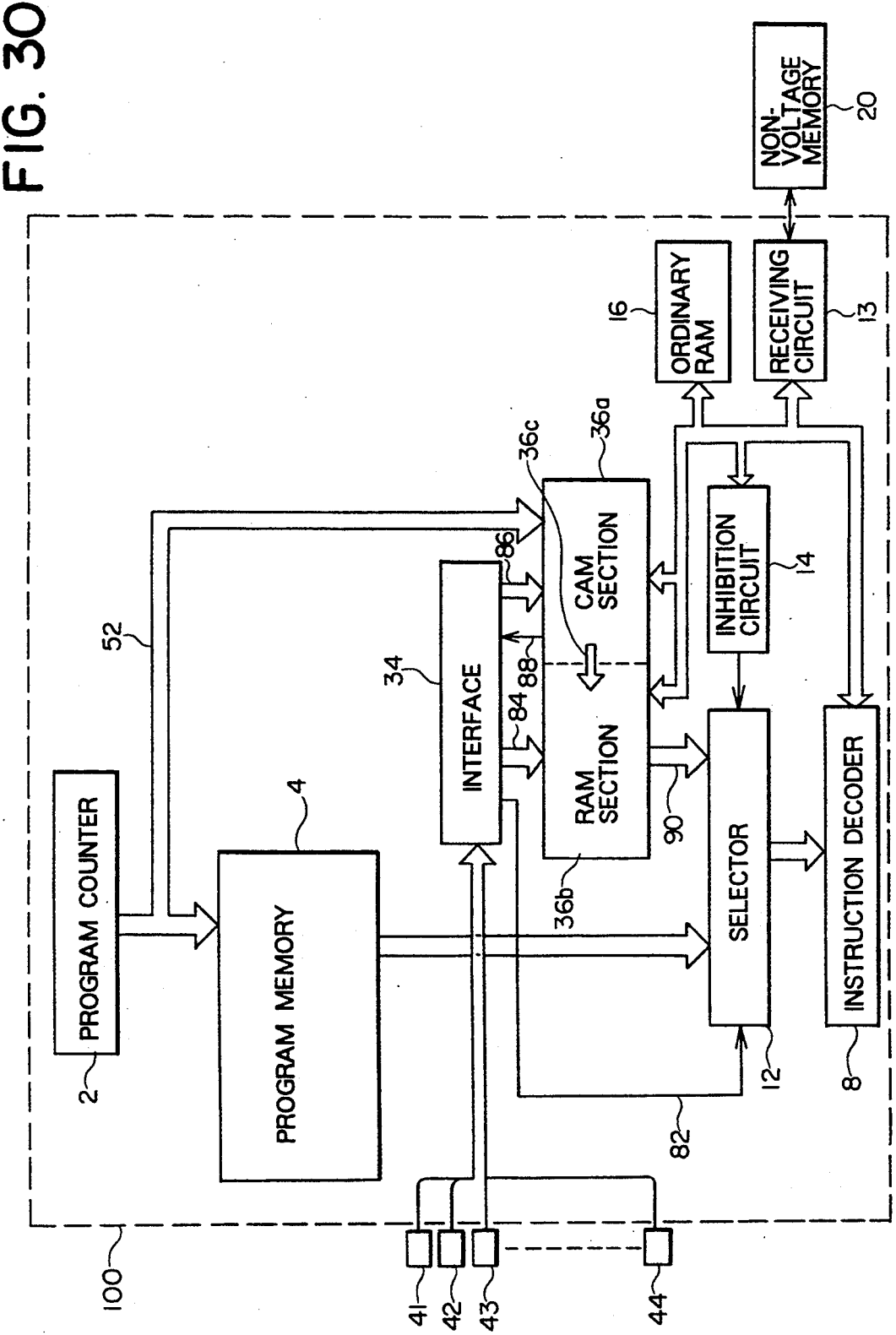
FIG. 30 is a block diagram showing the configuration of another embodiment of the microcomputer of the third aspect according to the present invention.

Next, FIG. 30 shows another example of the configuration of the one-chip microcomputer in which the insertion of change instruction codes is possible according to the third aspect of the present invention.

In this embodiment, thanks to an inhibition circuit additionally disposed in the constitution of FIG. 27, change instruction codes can be inserted into the program memory 4 like in the structure of FIG. 1 according to the first aspect of the present invention.

[Embodiment 4]

Figure 32:
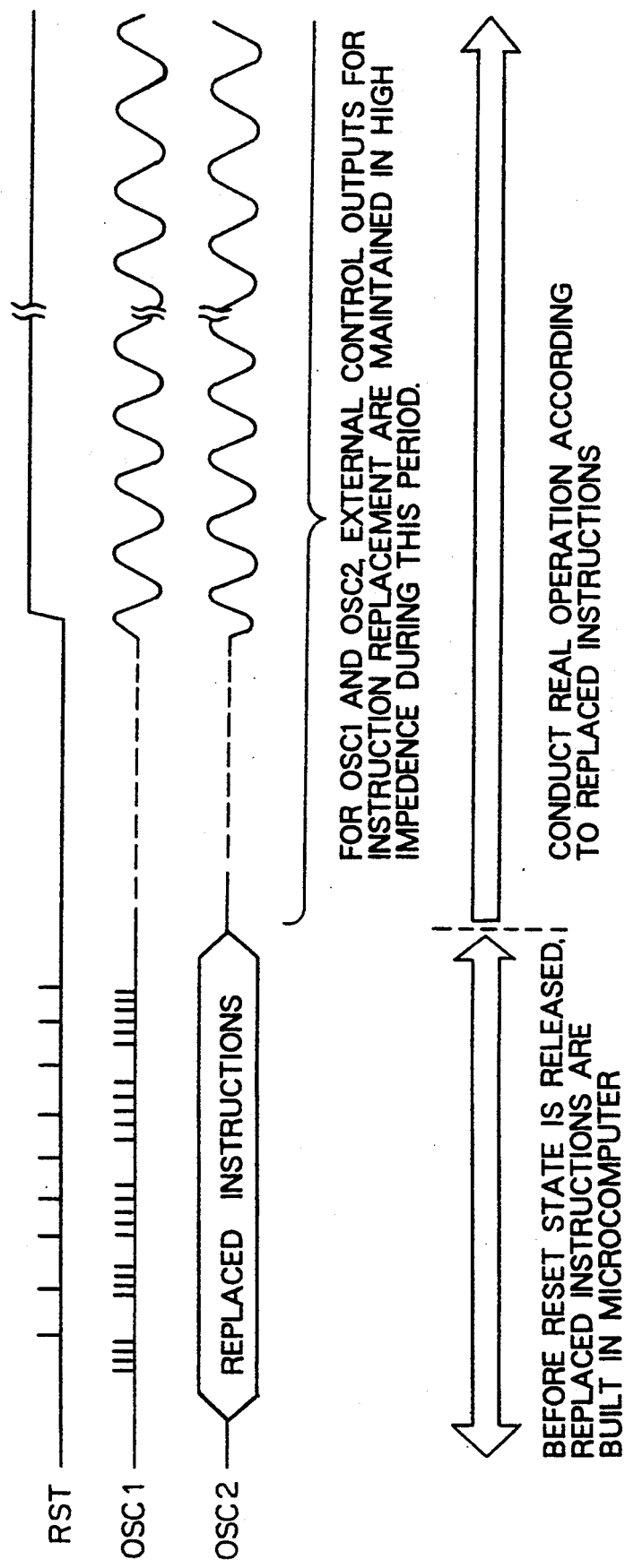
FIG. 32 is a signal timing chart of operation of replacement of instructions in the configuration example of FIG. 31.
Figure 33:
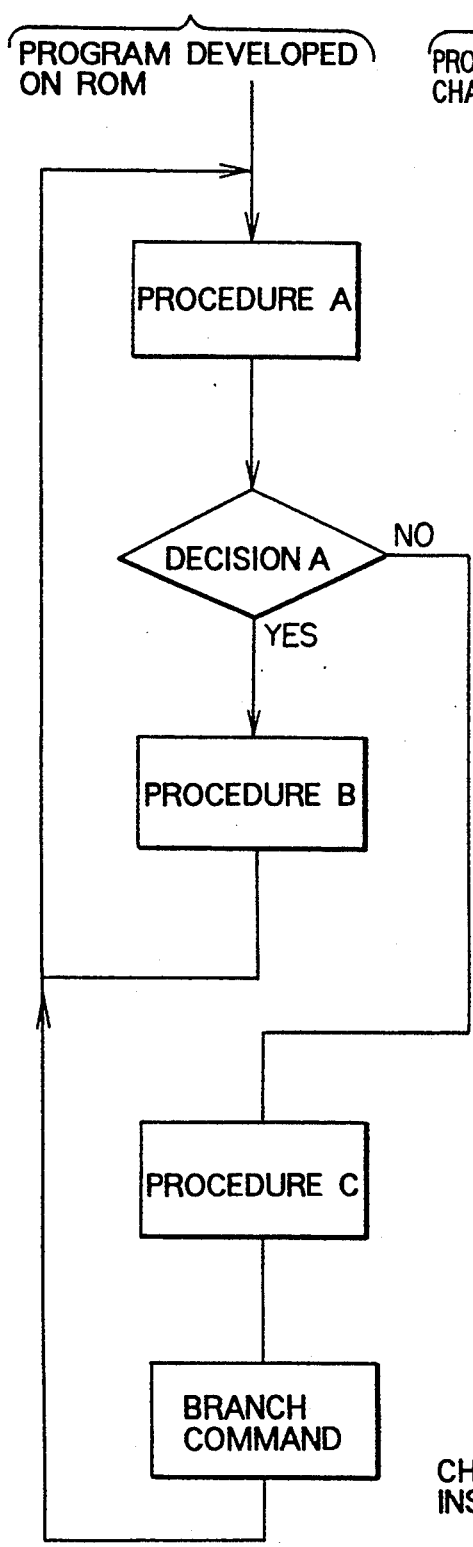
FIG. 33 is a flowchart showing a program example in the example of FIG. 31.
Figure 34:
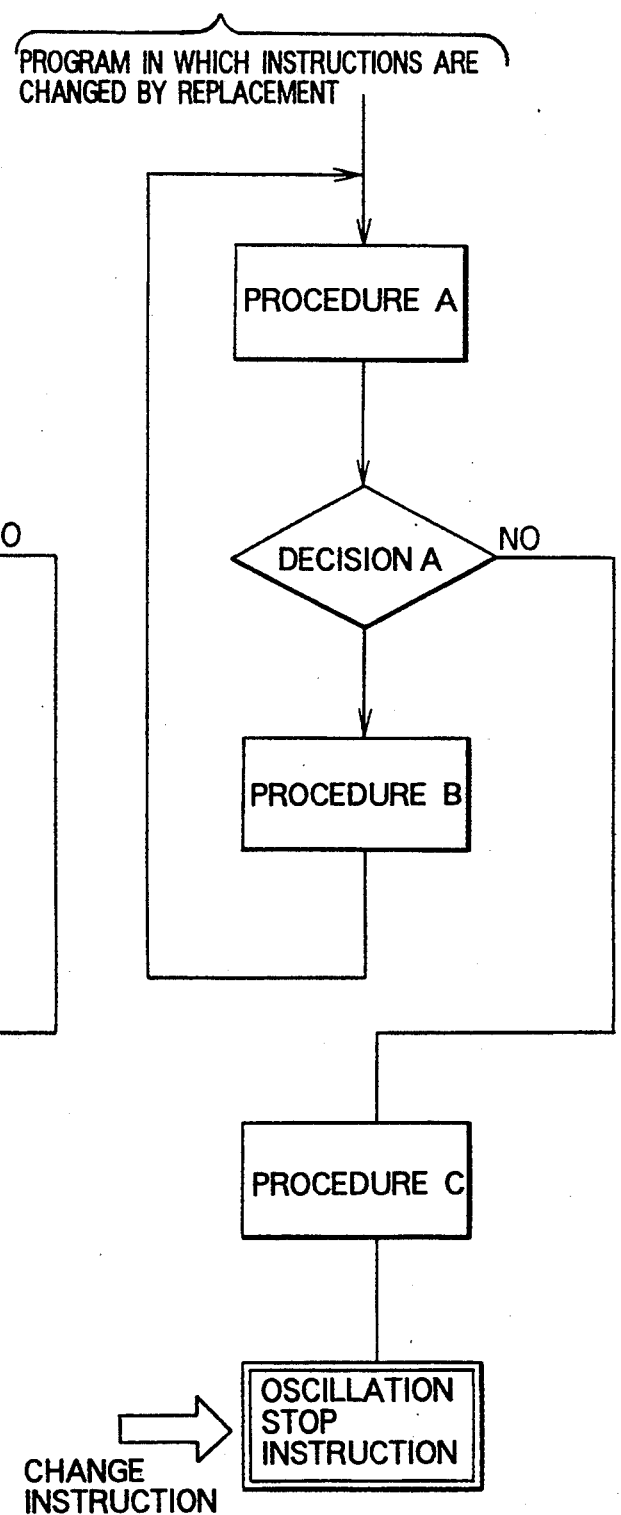
FIG. 34 is a flowchart showing the operation to be conducted after a program replacement of FIG. 33.
Figure 35:
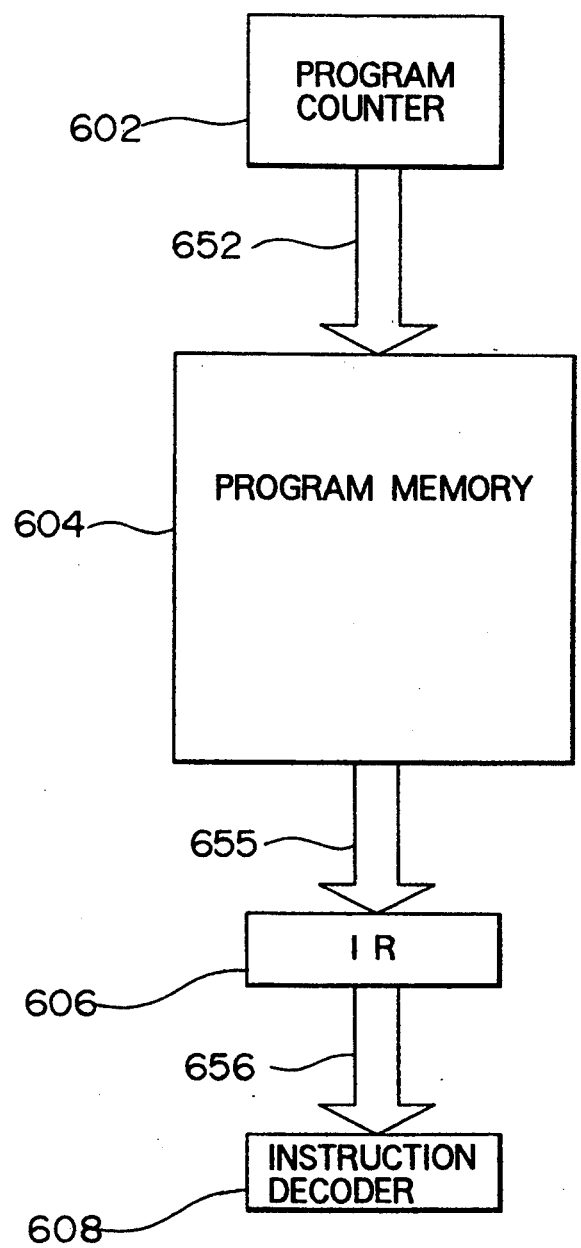
FIG. 35 is a block diagram showing an example of the configuration of a conventional one-chip microcomputer.
Figure 36:
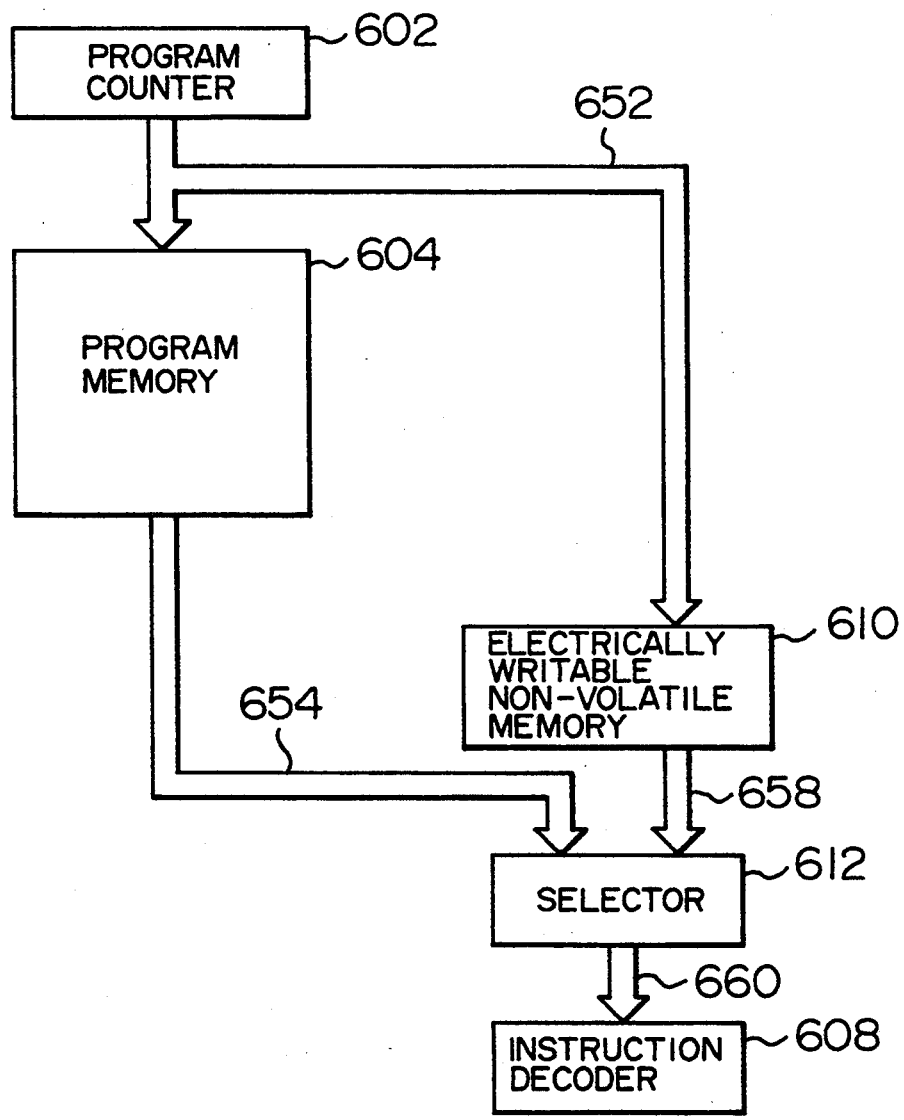
FIG. 36 is a block diagram showing another example of the configuration of a conventional one-chip microcomputer in which a non-volatile memory is incorporated.

FIG. 31 shows an embodiment in which the present invention is applied to an actual apparatus, FIG. 32 is a signal timing chart showing the operation of replacement of instructions in this application example, FIG. 33 is a flowchart showing the original program flow, and FIG. 34 is a flowchart showing changes in the program flow associated with a replacement instruction. The application example of the apparatus will now be described by reference to these diagrams.

In FIG. 31, a target system 500 as the actual apparatus includes a microcomputer 100 for analyzing any faults in the system, a crystal oscillator 508, and other constituent elements 501 to 507. The microcomputer 100 thus mounted on the apparatus has oscillation terminals OSC1 510 and OSC2 511 and a reset terminal 512, which are connected to an external control circuit 513 for the instruction replacement. The circuit 513 includes a shift register 514 for storing therein change or replacement address data and replacement instruction codes, a shift register 517 for keeping therein a write recognition code, an interface keyboard 518 for setting therefrom data, a selector 515 for selecting either one of the outputs respectively from the shift registers 514 and 517, and a control circuit 516 for controlling operations of these functional blocks.

A method of using the apparatus will next be described.

When the microcomputer 100 detects a wrong operation in the target system 500, the user checks several positions of the program possibly related to the erroneous operation to minimize the program positions to be checked. Thereafter, a program change is conducted to thereby determine whether or not the program is executed according to the appropriate program flow. A concrete example of the operation of FIGS. 33 and 34 will be now described. FIG. 33 shows a program flow of the program developed on the ROM. If a trouble occurs in the operation of "processing A", the operation following "decision A" is employed as a criterion of decision for a normal operation of the processing A. Consequently, "branch instruction" after "processing C" is replaced by "oscillation stop instruction" so as to thereafter observe signals from the oscillation terminal OSC1 510 by an oscilloscope or the like, thereby recognizing the program flow via an external terminal of the microcomputer 100. In this example, there is used the following function of the apparatus. Namely, in response to the oscillation stop instruction, the oscillation terminal OSC1 510 is fixed to "L level" or "H level" by a control circuit in the microcomputer 100 and hence the oscillation state is suppressed. Depending on the object to be analyzed, it is also possible to adopt a display system connected to the microcomputer 100. Through repetitiously conducting the instruction replacement for the analysis by use of the external control circuit 513, it is guaranteed that the problems or the erroneous codes of the program can be finally decided.

In the operation via the external controller 513, a plurality of change addresses and associated data are inputted from a keyboard 518 of the controller 513, thereby storing change instruction codes and change address data in the shift register 514. Change address data and change instruction codes, which are necessary for the program change, are sent with a write recognition code via the OSC1 terminal 510, the OSC2 terminal 511, and the reset terminal 512 to the microcomputer 100 according to the timing shown in FIG. 32. When the replacement information items are completely inputted thereto, the reset terminal 512 is set to the non-active state (to the H level in FIG. 32) and the control circuit 513 is simultaneously inhibited from driving the OSC1 terminal 510 and the OSC2 terminal 512 (namely, the high-impedance state is established). This leads the target system 500 to a free-running state. Since the target system 500 operates in a state where a portion of the instruction codes is thus replaced in the internal ROM, the operation shown in FIG. 34 can be accomplished, thereby deciding whether or not the processing A achieves the normal operation.

As above, in accordance with the present invention, the operation of a complex system in which the microcomputer is incorporated can be analyzed in an actual running state thereof by use of a simple measuring apparatus and through easy operations. Consequently, the present invention provides quite effective means for improving the system reliability and for analyzing wrong operations of the system.

According to the microcomputer of the present invention, in the microcomputer system incorporated in an electronic apparatus or the like, data arbitrarily written in the associative memory of the microcomputer in response to a signal supplied from an external device can be outputted in place of data from the program memory. Consequently, when a trouble occurs due to a wrong operation of the microcomputer incorporated in an electronic apparatus, the program loaded therein can be altered from an external device disposed at a location external with respect to the electronic apparatus, thereby achieving the most effective means for determining the cause of the trouble.

Furthermore, in the microcomputer according to the present invention, since the program stored therein can be changed by inputting serial data thereto from an external device, there are required a few terminals for the program modification.

In consequence, it is possible to improve the performance and reliability control in the quite complicated electronic apparatuses and systems in which the microcomputer is incorporated.

While particular embodiments of the invention have been shown and described, it will be obvious to those skilled in the art that various changes and modifications may be made without departing from the present invention in its broader aspects.

We claim:

1. An apparatus comprising:
a one-chip microcomputer operating according to program data;
a memory section; and
a connection line for connecting the one-chip microcomputer to the memory section, wherein:
the one-chip microcomputer includes:
   a program counter for producing an address output;
   a read-only memory for storing therein the program data and for outputting the program data in response to the address output, wherein the read-only memory has at least a change address which stores a portion of the program data which is to be replaced with a change instruction code;
   a random-access memory for storing change address data representing the change address and the change instruction code and for outputting the change instruction code when the change address data matches the address output;
   comparing means for comparing the change address data with the address output;
   data exchange means for receiving the program data output by the read-only memory and the change instruction code output by the random-access memory and for substituting the change instruction code for the portion of the program data which is to be replaced, when the comparing means determines that the change address data matches the address output; and
   inhibition means for inhibiting operation of the comparing means while a rewrite operation is being executed in the random access memory;
the microcomputer executing the change instruction code when the change address data matches the address output and operating according to the program data in the read-only memory when the change address is unequal to the address output;
the memory section having at least one exchange address for storing at least one externally supplied change address data and at least one externally supplied change instruction code and having change information storing means for storing therein the at least one exchange address; and
the connection line transmitting the at least one externally supplied change address and the at least one externally supplied change instruction code stored in the memory section to the random-access memory according to the at least one exchange address stored in the change information storing means so that the random-access memory stores the at least one externally supplied change address and the at least one externally supplied change instruction code as the change address and change instruction code.

2. An apparatus according to claim 1, wherein:
the random-access memory includes at least one change address storing section for storing therein the change address data and at least one change instruction code storing section for storing therein the change instruction code;

the comparing means includes at least one comparing circuit connected to the at least one change address storing section, the at least one comparing circuit comparing the change address data stored in the at least one change address storing section with the address output and producing a control signal when the change address data coincides with the address output; and the data exchange means includes at least one gate connected to an output from the change instruction code storing section, the at least one gate being connected to the at least one change instruction code storing section and being released in response to the control signal to output the change instruction code.

3. An apparatus according to claim 1, wherein the connection line is a serial communication line.

4. An apparatus according to claim 1, wherein the memory section is a non-volatile memory.

5. An apparatus according to claim 4, wherein the non-volatile memory is an EPROM.

6. An apparatus according to claim 4, wherein the non-volatile memory is an EEPROM.

7. A microcomputer comprising:

a read-only memory for storing therein instructions to be executed, the read-only memory having at least one address indicating an area where program data to be replaced by a change instruction code is stored;

a first program counter for outputting an execution address of the read-only memory from which one of the instructions to be executed is read and for controlling the read-only memory to output the one of the instructions to be executed;

a random access memory storing at a recording address, when the random access memory contains the change instruction code, change address data indicating a replacement address of the read-only memory in which the program data to be replaced is stored, the change instruction code and a control code and for outputting the change address data and the control code;

a second program counter for receiving the change address data and the control code, for controlling the random access memory to output the change instruction code from the recording address when the execution address coincides with the change address data and for outputting a selection signal when the execution address coincides with the change address data; and a change-over means a for receiving the one of the instructions to be executed, the change instruction code and the selection signal output, for selecting as an obtained instruction either the one of the instructions to be executed or the change instruction code in accordance with the selection signal, and for outputting the obtained instruction.

8. A microcomputer according to claim 7, further including:

an internal bus for receiving an external input of the change instruction code, change address data and the control code and a write control section for receiving from the internal bus the external input of the change instruction code, the change address data and the control code and for supplying the random access memory with the change address data, the change instruction code and the control code.

9. A microcomputer according to claim 7, wherein:

the random access memory generates an address coincidence signal when the execution address matches the change address data;

the second program counter includes:

a selector for outputting an address signal;

a parallel load counter for receiving the address signal as an input thereto and outputting the recording address;

a sub-program counter stack for receiving the recording address and outputting a replacement address;

a decoder for receiving the control code from the random access memory, converting the code into an executable instruction containing an insertion end signal, and outputting the instruction; and a subprogram counter control circuit for receiving the converted control code, the address coincidence code and an interruption signal, and outputting in accordance with states respectively of the received items a selection control signal denoting a signal to be selected by the selector, a counter control signal controlling a parallel load operation and a counting operation of the parallel load counter, and a stack control signal controlling a pop operation and a push operation of the sub-program counter, the selector receiving as inputs thereto an execution address outputted from the first program counter and the replacement address outputted from the sub-program counter stack and outputting the address signal according to the selection control signal, the selector selecting and outputting, when the address coincidence signal is absent, the execution address according to the selection control signal, the parallel load counter outputting, when the address coincidence signal is absent, the execution address as a recording address through the parallel load operation, the sub-program counter stack pushing according to the stack control signal, when the address coincidence signal is received, the recording address outputted from the parallel load counter, the parallel load counter achieving the counting operation according to the counter control signal, when the address coincidence signal is received, thereby outputting an incremented recording address value, the sub-program counter stack conducting a pop operation, when the decoder recognizes the insertion end signal, thereby outputting as a replacement address the recording address recorded in advance, the selector selecting and outputting, when the decoder recognizes the insertion end signal, thereby outputting the replacement address according to the selection control signal.

10. A microcomputer according to claim 7, wherein:

the random access memory includes a content-addressable memory section and a random-access memory section;

the content addressable memory section stores therein the change address data, sets as an associative input the execution address output by the first program counter, sets as an association objective input the change address data and outputs, when the associative input coincides with the association objective input, a coincidence signal and a memory selection signal to the second program counter and the random-access memory section, respectively; and the random-access memory section stores the change instruction code and supplies a portion of the change instruction code specified by the memory selection signal to the change-over means.

11. A one-chip microcomputer comprising:
a program counter for outputting a memory address;
a read-only memory for storing instructions to be executed, receiving the memory address and outputting one of the instructions which corresponds to the memory address;
an associative memory for storing change address data and a change instruction code, the associative memory receiving the memory address and outputting the change instruction code when the memory address coincides with the change address data;
an input terminal for receiving as inputs from an external device the change address data and the change instruction code for storage in the associative memory;
an interface for writing in the associative memory the change address data and the change instruction code inputted to the input terminal; and
program execution means for executing, when the memory address coincides with the change address data, the change instruction code outputted from the associative memory in place of the one of the instructions outputted from the read-only memory.

12. A microcomputer according to claim 11, wherein:
the associative memory includes a content-addressable memory section and a random-access memory section;
the content addressable memory section stores the change address data, sets as an associative input the memory address, sets as an association objective input the address data contained in the sequence of data supplied from the interface, and outputs, when the associative input coincides with the association objective input, a coincidence signal and a memory selection signal to the interface and the random-access memory section, respectively; and
the random-access memory section stores the change instruction code and supplies a portion of the change instruction code specified by the memory selection signal to the selector.

13. A microcomputer comprising:
a program counter for outputting an execution address;
a read-only memory for storing therein instructions of a program and for outputting the instructions of the program in accordance with the execution address;
an address register for storing therein at least a location address;
a comparator connected to the program counter and the address register for comparing the execution address output from the program counter and the location address stored in the address register;

a change program storing section for storing therein a change instruction code and for outputting the change instruction code when the comparator determines that the execution address coincides with the location address;
processing means for receiving the instructions of the program and the change instruction code and for executing the change instruction code stored in the change program storing section in place of one of the instructions stored in the read-only memory when the comparator determines that the execution address coincides with the location address; and
an inhibition circuit for inhibiting operation of the comparator during a rewrite operation executed to store the location address in the address register.

14. A microcomputer system comprising:
a microcomputer; and
an external memory;
the microcomputer including:
a program counter for outputting an execution address;
a read-only memory for storing therein instructions of a program and for outputting the instructions of the program in accordance with the execution address;
an address register for storing therein at least a location address;
a comparator connected to the program counter and the address register for comparing the execution address from the program counter and the location address stored in the address register;
a change program storing section for storing a change instruction code and for outputting the change instruction code when the comparator determines that the execution address coincides with the location address; and
a read address storing section for storing a read address; and
processing means for receiving the instructions of the program and the change instruction code and for executing the change instruction code stored in the change program storing section in place of the instructions of the program stored in the read-only memory when the comparator determines that the execution address coincides with the location address;
the external memory being externally connected to the microcomputer and storing therein a plurality of additional change instruction codes to be stored in the change program storing section, wherein:
the microcomputer reads one of the plurality of additional change instruction codes from the external memory according to the read address stored in the read address storing section and replaces the change instruction code stored in the change program storing section with one of the plurality of additional change instruction codes in accordance with a change program stored in the read-only memory.

15. A microcomputer system according to claim 14, wherein the external memory comprises a non-volatile memory.

16. A microcomputer system according to claim 14, wherein the microcomputer rewrites the read address in accordance with the change program.

* * * * *